(12) United States Patent
Sahin et al.

(10) Patent No.: US 10,764,102 B2
(45) Date of Patent: Sep. 1, 2020

(54) APPARATUS AND METHODS FOR NON-SYSTEMATIC COMPLEX CODED DISCRETE FOURIER TRANSFORM SPREAD ORTHOGONAL FREQUENCY DIVISION MULTIPLEXING

(71) Applicant: IDAC Holdings, Inc., Wilmington, DE (US)

(72) Inventors: Alphan Sahin, Westbury, NY (US); Mihaela C Beluri, Jericho, NY (US); Rui Yang, Greenlawn, NY (US); Erdem Bala, East Meadow, NY (US); Afshin Haghighat, Ile-Bizard (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/094,748

(22) PCT Filed: Apr. 20, 2017

(86) PCT No.: PCT/US2017/028549
§ 371 (c)(1),
(2) Date: Oct. 18, 2018

(87) PCT Pub. No.: WO2017/189316
PCT Pub. Date: Nov. 2, 2017

(65) Prior Publication Data
US 2020/0052948 A1  Feb. 13, 2020

Related U.S. Application Data

(60) Provisional application No. 62/327,259, filed on Apr. 25, 2016.

(51) Int. Cl.
*H04L 27/26* (2006.01)
*H04L 5/00* (2006.01)
*H04B 1/7085* (2011.01)

(52) U.S. Cl.
CPC ....... *H04L 27/2636* (2013.01); *H04B 1/7085* (2013.01); *H04L 5/001* (2013.01); *H04L 27/2607* (2013.01)

(58) Field of Classification Search
None
See application file for complete search history.

(56) References Cited

U.S. PATENT DOCUMENTS 9,544,171 B2 * 1/2017 Berardinelli ...... H04L 25/03343
                                                                    370/328
2015/0333944 A1 * 11/2015 Bae .................. H04L 25/03821
                                                                    375/296

(Continued)

FOREIGN PATENT DOCUMENTS

| WO | WO-2014/124661 | 8/2014 |
|----|----------------|--------|
| WO | WO-2017/007900 | 1/2017 |
| WO | WO-2017/095909 | 6/2017 |

OTHER PUBLICATIONS

"Notification of Transmittal of the International Search Report and Written Opinion of the International Searching Authority", PCT Application No. PCT/US17/28549, dated Jul. 18, 2017, 12 pages.

(Continued)

*Primary Examiner* — Anh Vu H Ly
(74) *Attorney, Agent, or Firm* — Julian F. Santos

(57) ABSTRACT

The invention pertains to methods and apparatus for non-systematic complex coded unique word DFT spread orthogonal frequency division multiplexing.

20 Claims, 20 Drawing Sheets

(56) References Cited

U.S. PATENT DOCUMENTS

| | | | |
|---|---|---|---|
| 2016/0036561 A1* | 2/2016 | Stopler | H04L 1/0045 714/776 |
| 2018/0198662 A1* | 7/2018 | Sahin | H04L 27/2605 370/328 |
| 2019/0097859 A1* | 3/2019 | Bala | H04L 27/2613 370/328 |

OTHER PUBLICATIONS

Berardinelli, Gilberto, et al., "On the potential of zero-tail DFT-spread-OFDM in 5G networks", Proc. IEEE VTC-Spring, Sep. 2014, 6 pages.

Berardinelli, Gilberto, et al., "Zero-tail DFT-spread-OFDM signals", IEEE Globecom Workshops, 2013, 6 pages.

Hasegawa, Fumihiro, et al., "Static Sequence Assisted Out-of-Band Power Suppression for DFT-s-OFDM", 2015 IEEE 26th International Symposium on Personal, Indoor and Mobile Radio Communications—(PIMRC): Fundamentals and PHY, Aug. 30, 2015, 6 pages.

Huemer, Mario, et al., "Design and Analysis of UW-OFDM signals", International Journal of Electronics and Communications vol. 68, No. 10, 2014, 11 pages.

Huemer, Mario, et al., "Non-Systematic Complex Number RS Coded OFDM by Unique Word Prefix", IEEE Transactions on Signal Processing; vol. 60, Issue 1, published Jan. 2012; pp. 285-299, Sep. 19, 2011, 15 pages.

Michailow, N., et al., "Generalized Frequency Division Multiplexing for 5th Generation Cellular Networks", IEEE Transactions on Communications, vol. 62, No. 9, Sep. 2014, 17 pages.

Michailow, Nicola, et al., "Generalized Frequency Division Multiplexing: Analysis of an Alternative Multi-Carrier Technique for Next Generation Cellular Systems", Proc. Int'l Symp. Wireless Communication System, Aug. 2012, 5 pages.

Pancaldi, Fabrizio, et al., "Single-Carrier Frequency Domain Equalization", IEEE Signal Processing Magazine, Sep. 2008, 20 pages.

Sahin, Alphan, et al., "An Improved Unique Word DFT-Spread OFDM Scheme for 5G Systems", IEEE Globecom Workshops, Dec. 6, 2015, 6 pages.

* cited by examiner

APPARATUS AND METHODS FOR NON-SYSTEMATIC COMPLEX CODED DISCRETE FOURIER TRANSFORM SPREAD ORTHOGONAL FREQUENCY DIVISION MULTIPLEXING

This application is a U.S. 371 National Stage Application of PCT Application No. PCT/US2017/028549, filed on Apr. 20, 2017, which claims priority to U.S. Provisional Application No. 62/327,259, filed on Apr. 25, 2016, the contents of which are incorporated by reference herein.

FIELD

Background

The structure of an air interface is one of the decisive factors in meeting the performance goals of a wireless communication system. At the same time, designing an air interface comes with many challenges in order to meet various distinct performance goals such as high spectral efficiency, robustness against adverse channel conditions, utilization of user diversity, fast feedback mechanisms, low latency, and less complexity at the transmitter and receiver.

The $5^{th}$ generation telecommunication system protocol (hereinafter 5G) that is currently under development by the $3^{rd}$ Generation Partnership Project (hereinafter 3GPP) is one example of a radio telecommunications system that would benefit from an air interface meeting the aforementioned performance goals.

SUMMARY

The invention pertains to methods and apparatus for non-systematic complex coded DFT spread orthogonal frequency division multiplexing.

In accordance with a first aspect, a method and apparatus of operation in a wireless network node is described for generating discrete Fourier transformation (DFT) spread orthogonal frequency division multiplexing (DFT-S-OFDM) symbols comprising: mapping a first symbol vector to inputs of a DFT-spread block using a permutation matrix, wherein the first, symbol vector comprises a plurality of modulated symbols to be transmitted within a block; inserting known symbols into the mapped first, symbol vector to produce a second vector, the known symbols mapped to inputs of the DFT-spread block to which symbols in the first, symbol vector are not mapped; inserting a perturbation into the second vector to produce a third vector; performing a DFT on the third vector to produce a fourth vector, wherein the perturbation is configured to generate zeros on predetermined elements of the fourth vector; performing an inverse DFT (IDFT) operation on the fourth vector to produce an IDFT output signal; cancelling a tail of the IDFT output signal to produce a modified IDFT output signal; and transmitting the modified IDFT output signal.

In accordance with another aspect, a method and apparatus of operation in a wireless network node is described for receiving discrete Fourier transformation (DFT) spread orthogonal frequency division multiplexing (DFT-S-OFDM) symbols comprising: receiving the DFT-S-OFDM symbols at an antenna; determining a DFT of the received symbols; replacing symbols in the received DFT-S-OFDM symbols that correspond to predetermined elements in the DFT-S-OFDM symbols with zeros and performing an inverse DFT on the remaining received symbols; determining a distortion vector on the symbols in the received DFT-S-OFDM symbols that correspond to predetermined elements; and subtracting the distortion vector from the remaining symbols.

DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely.

Furthermore, like reference numerals in the Figures indicate like elements, and wherein.

Figure 9:
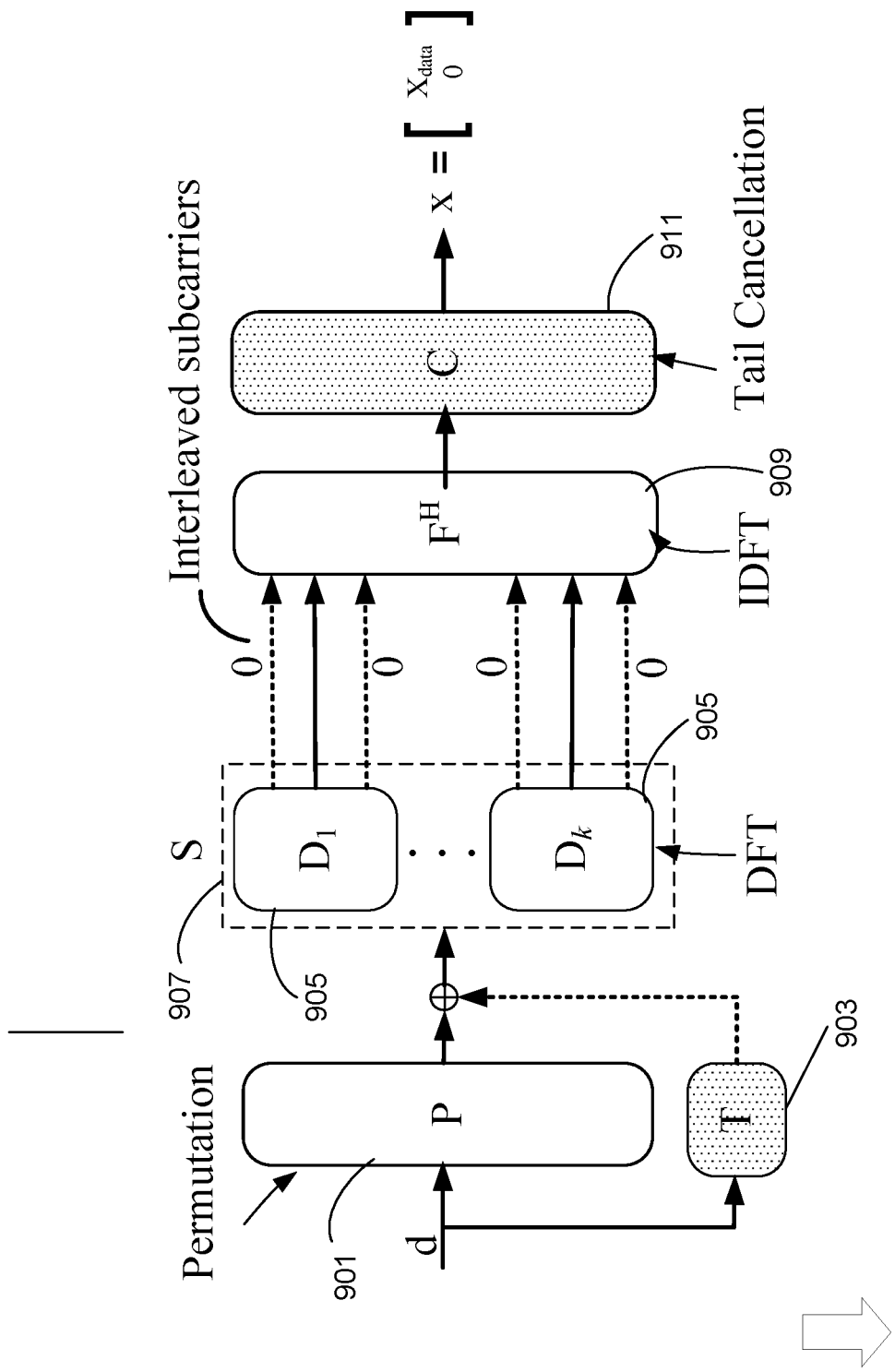
FIG. 9 is a block diagram illustrating a non-systematic complex coded UW DFT-SW-OFDM transmitter structure in accordance with an embodiment.
Figure 10:
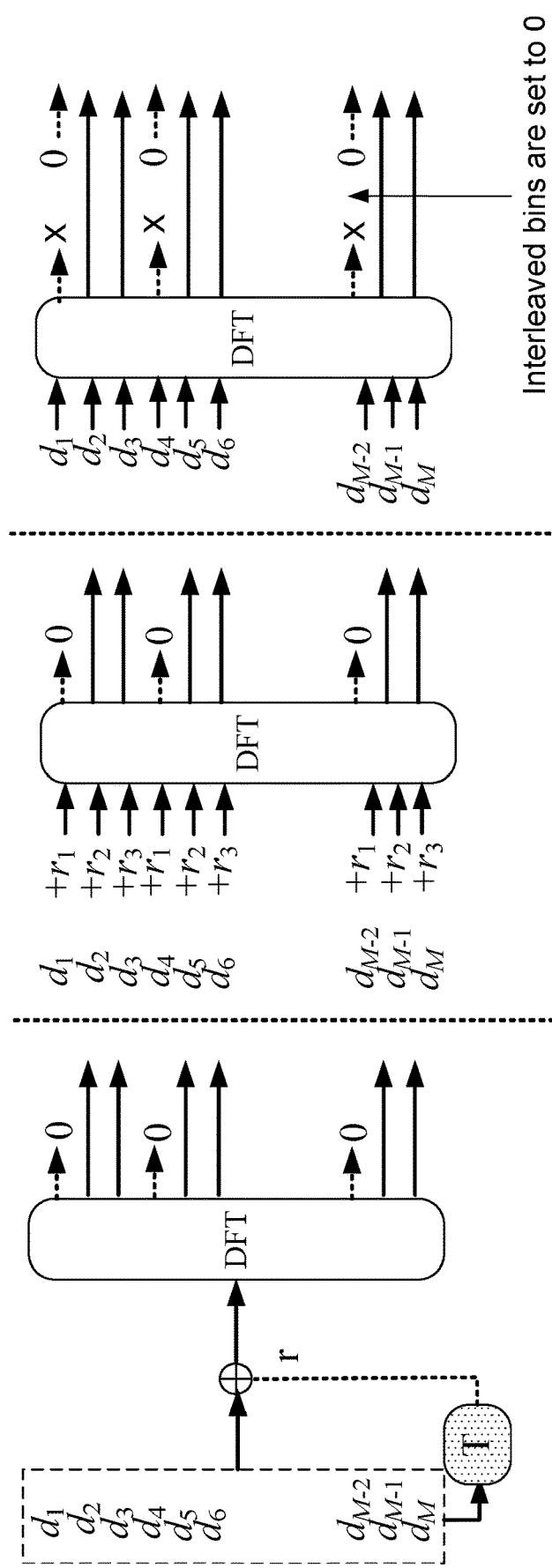
Figure 11:
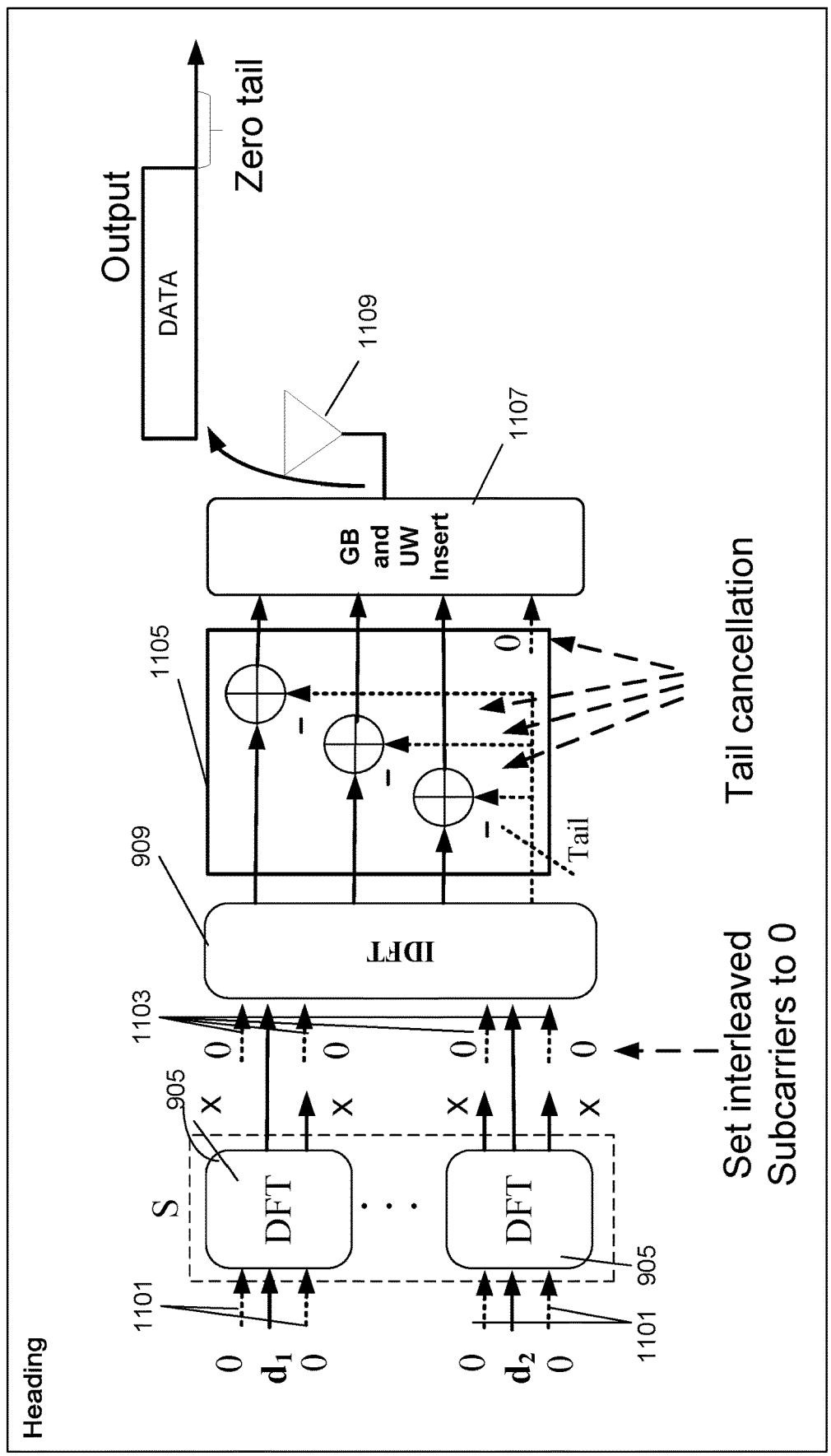
Figure 12:
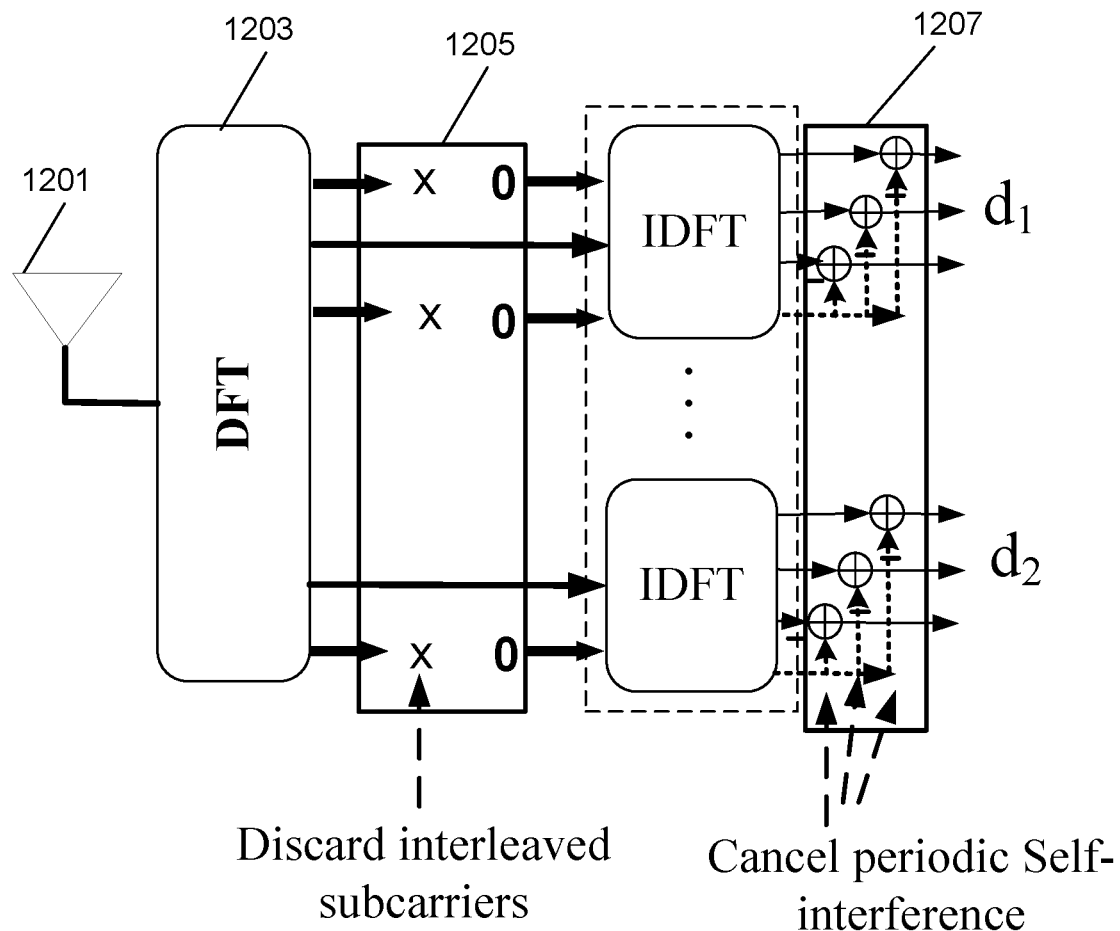
Figure 13:
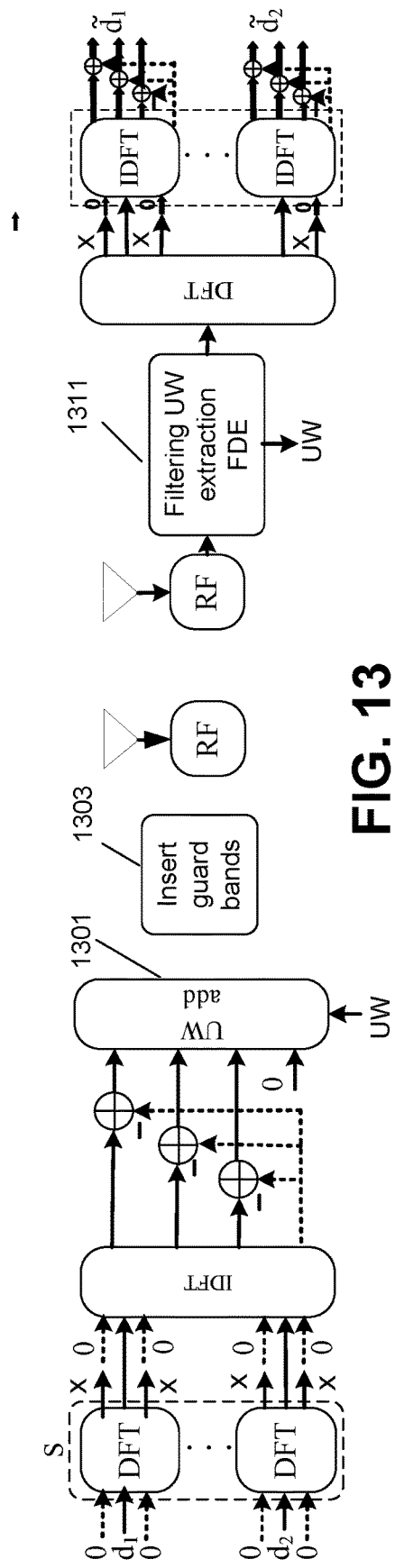
Figure 14:
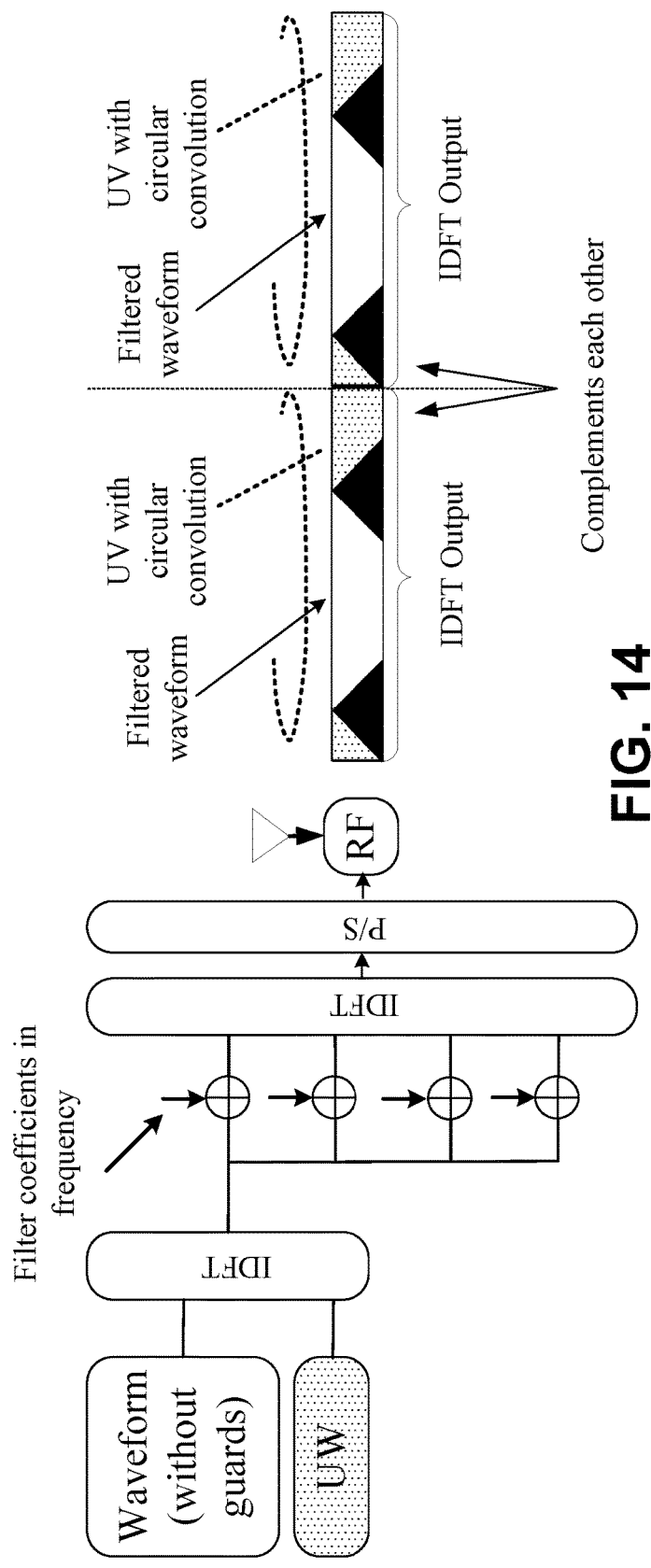
Figure 15:
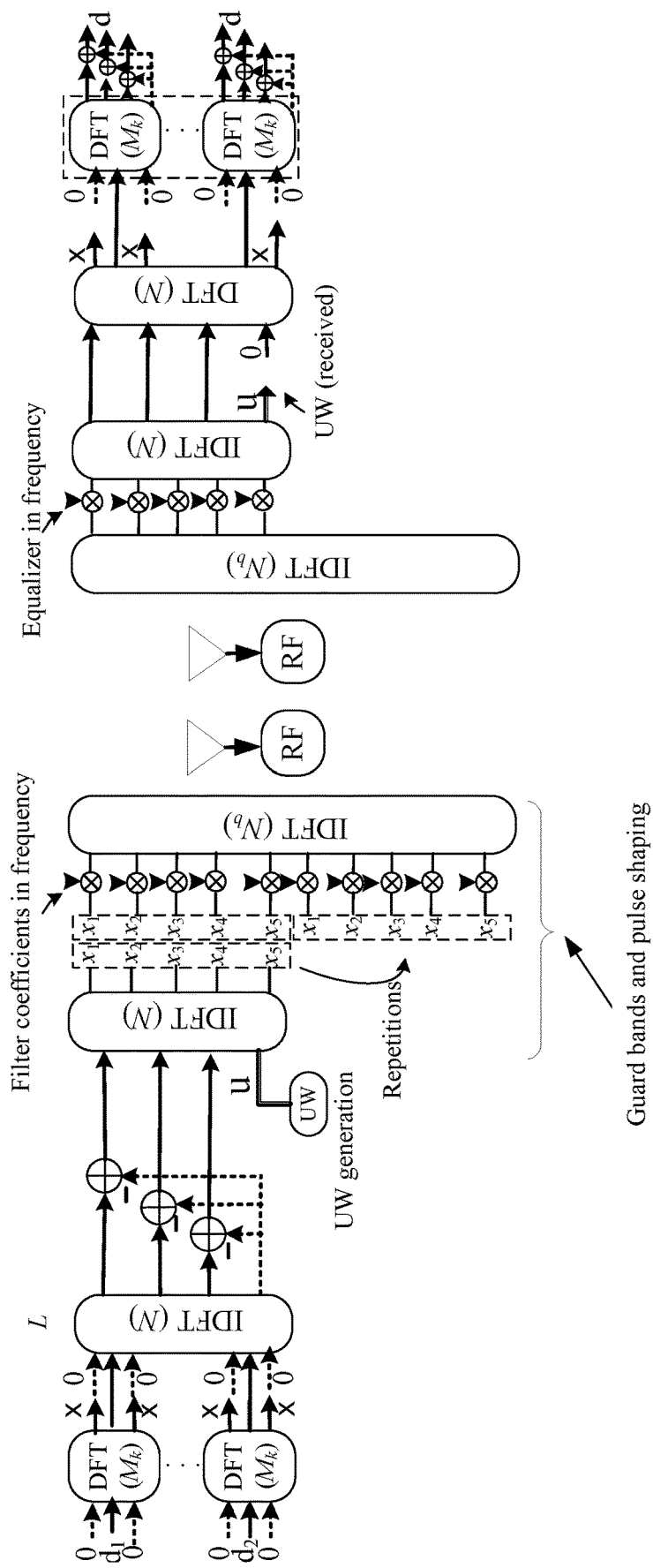
Figure 16A:
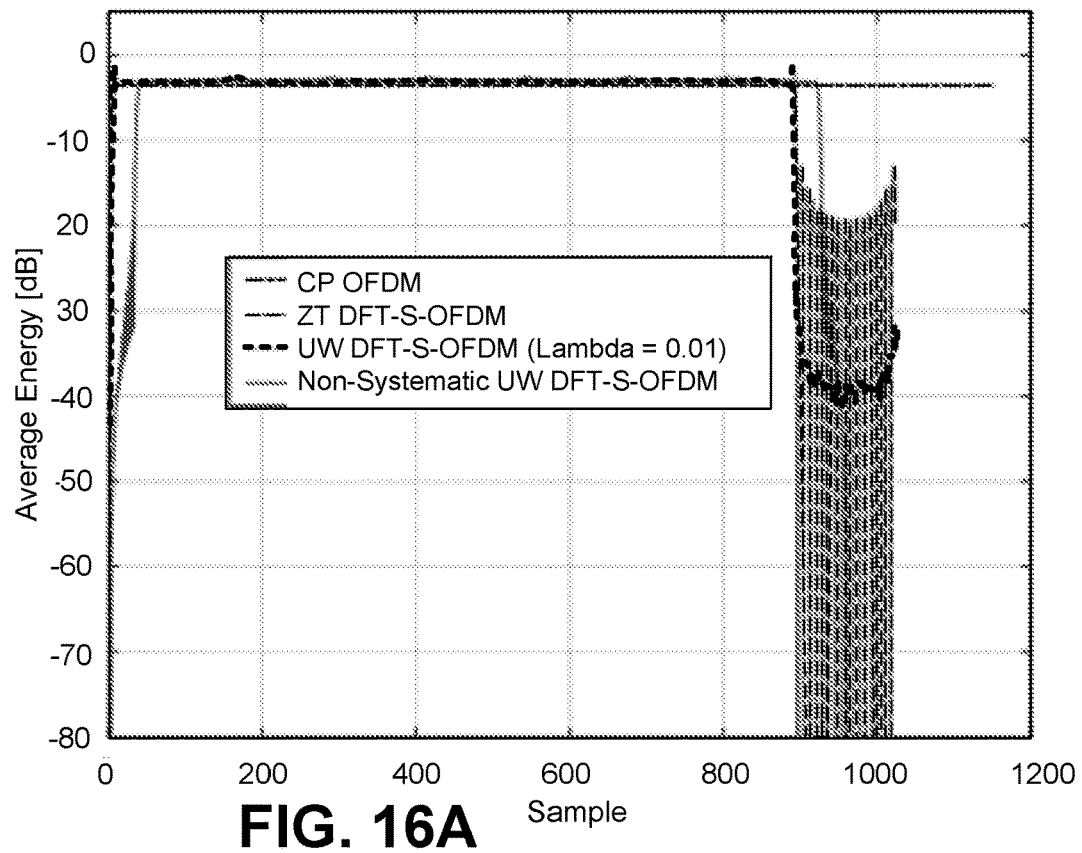
Figure 16B:
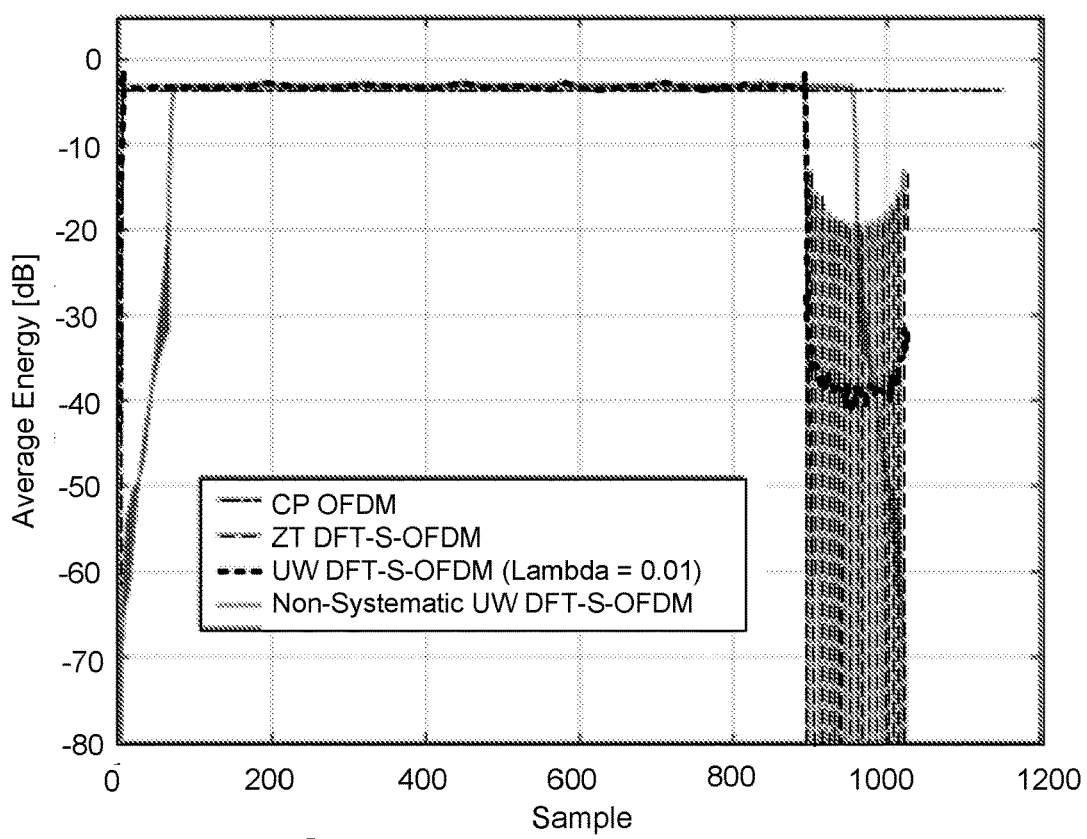

FIGS. 10A, 10B, and 10C are block diagrams illustrating three equivalent functional structures for a transmitter for periodic self-interference in accordance with an embodiment;

FIG. 11 is a more detailed block diagram illustrating a portion of the non-systematic complex coded UW DFT-SW-OFDM transmitter structure of FIG. 9;

FIG. 12 is a block diagram illustrating a non-systematic complex coded UW DFT-SW-OFDM receiver structure in accordance with an embodiment;

FIG. 13 is a block diagram illustrating the transmitter structure and the receiver structure in accordance with an embodiment further including the use of UW and guard bands;

FIG. 14 is a diagram illustrating a scheme for exploiting the existence of UW in connection with a low-complexity implementation of the convolution operation;

FIG. 15 is a block diagram illustrating the overall transmitter structure and receiver structure in accordance with an exemplary embodiment;

FIG. 16A is a graph showing a comparison of average energy for CP OFDM, ZT DFT-S-OFDM, UW DFT-S-OFDM, and non-systematic complex coded UW DFT-S-OFDM for a filter length of 64 according to simulations;

FIG. 16B is a graph showing a comparison of average energy for CP OFDM, ZT DFT-S-OFDM, UW DFT-S-

Figure 17A:
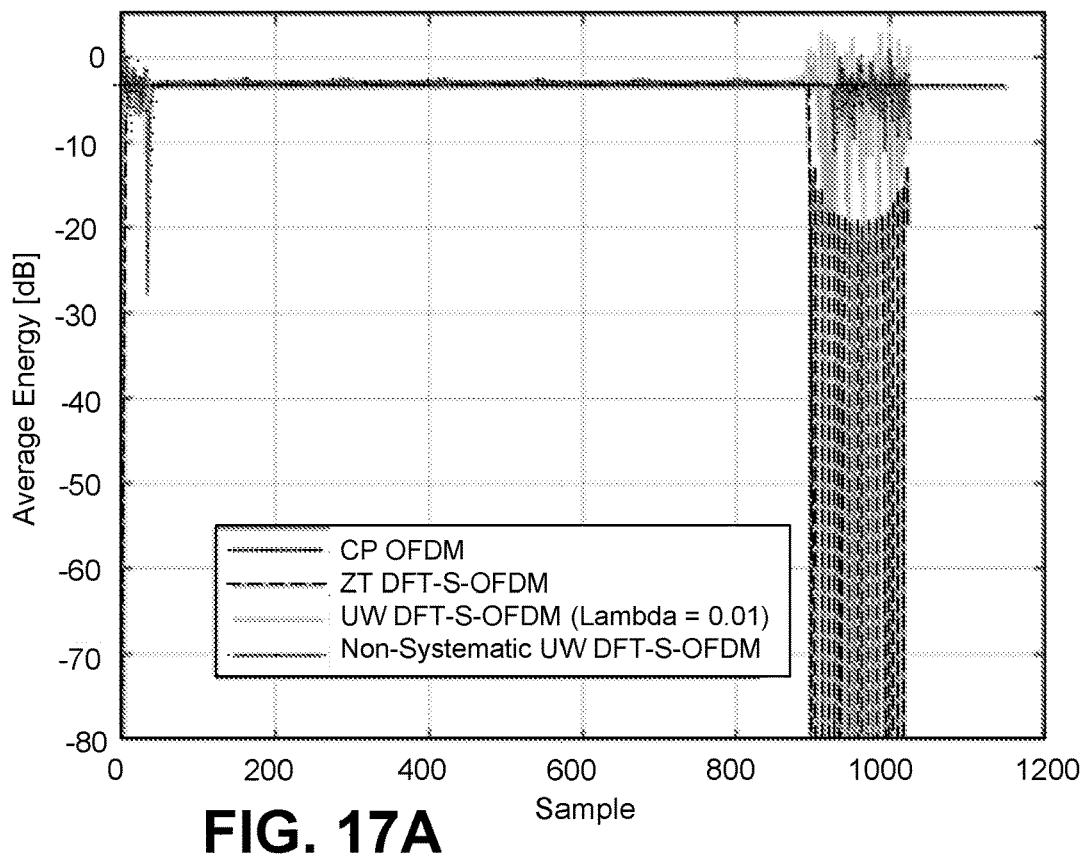
Figure 17B:
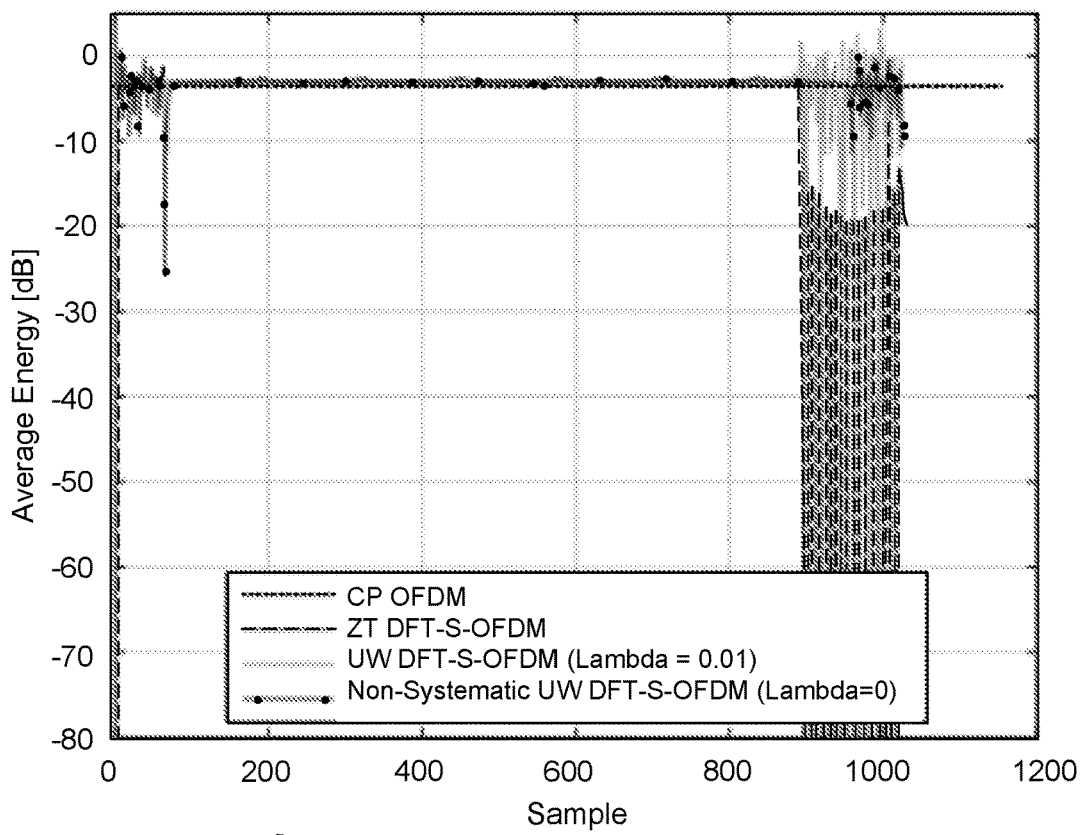
Figure 18A:
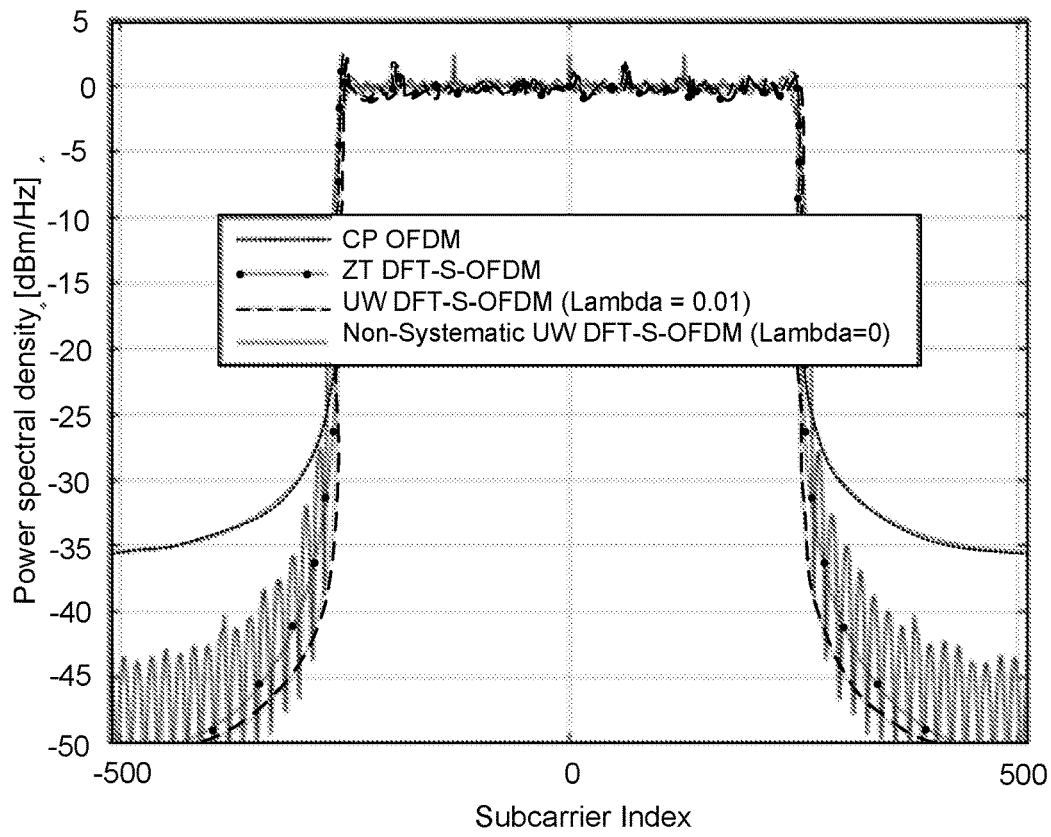
Figure 18B:
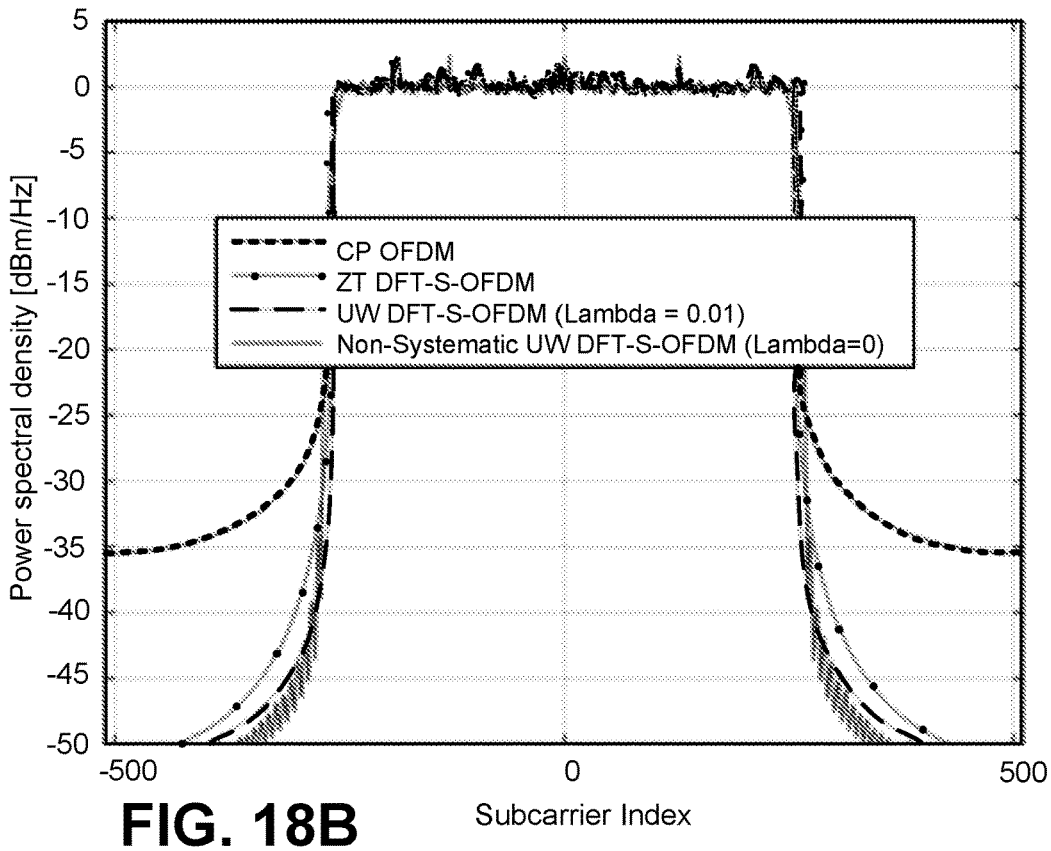
Figure 19:
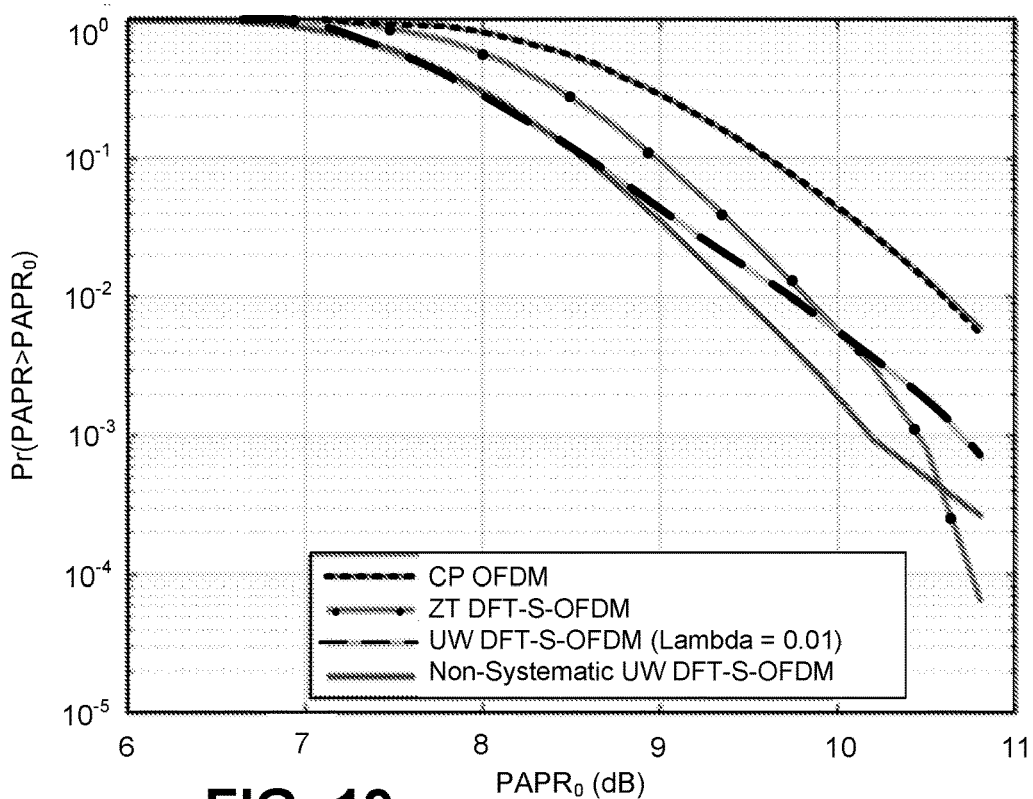
Figure 20:
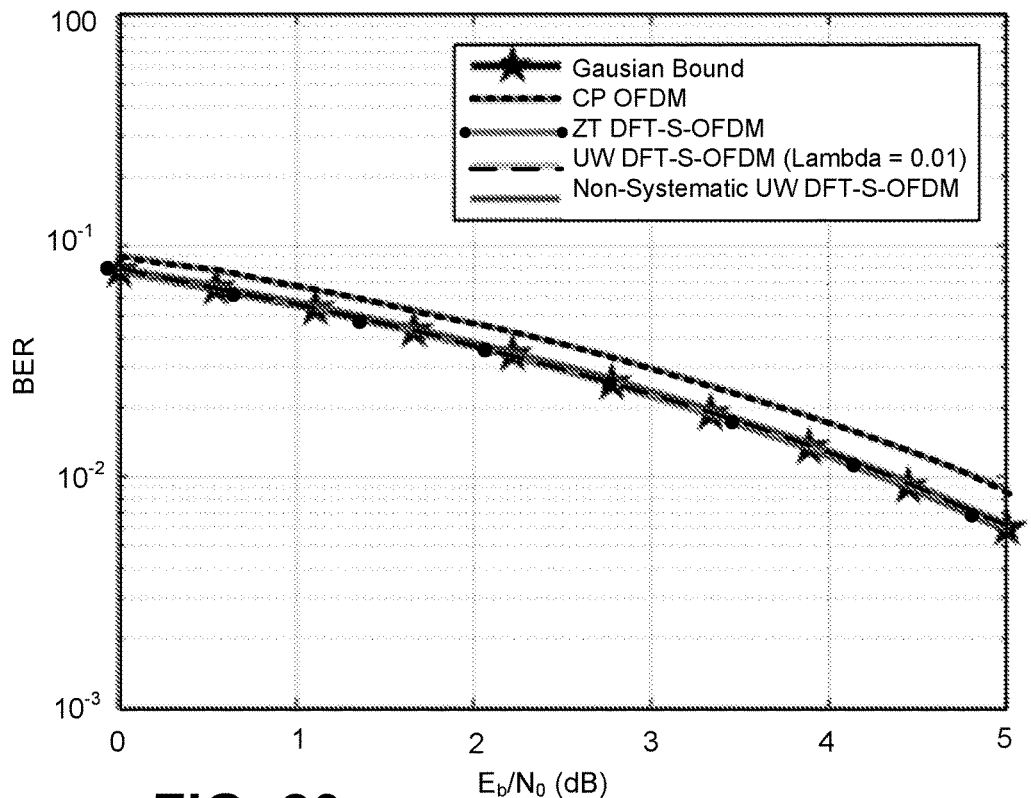
Figure 21:
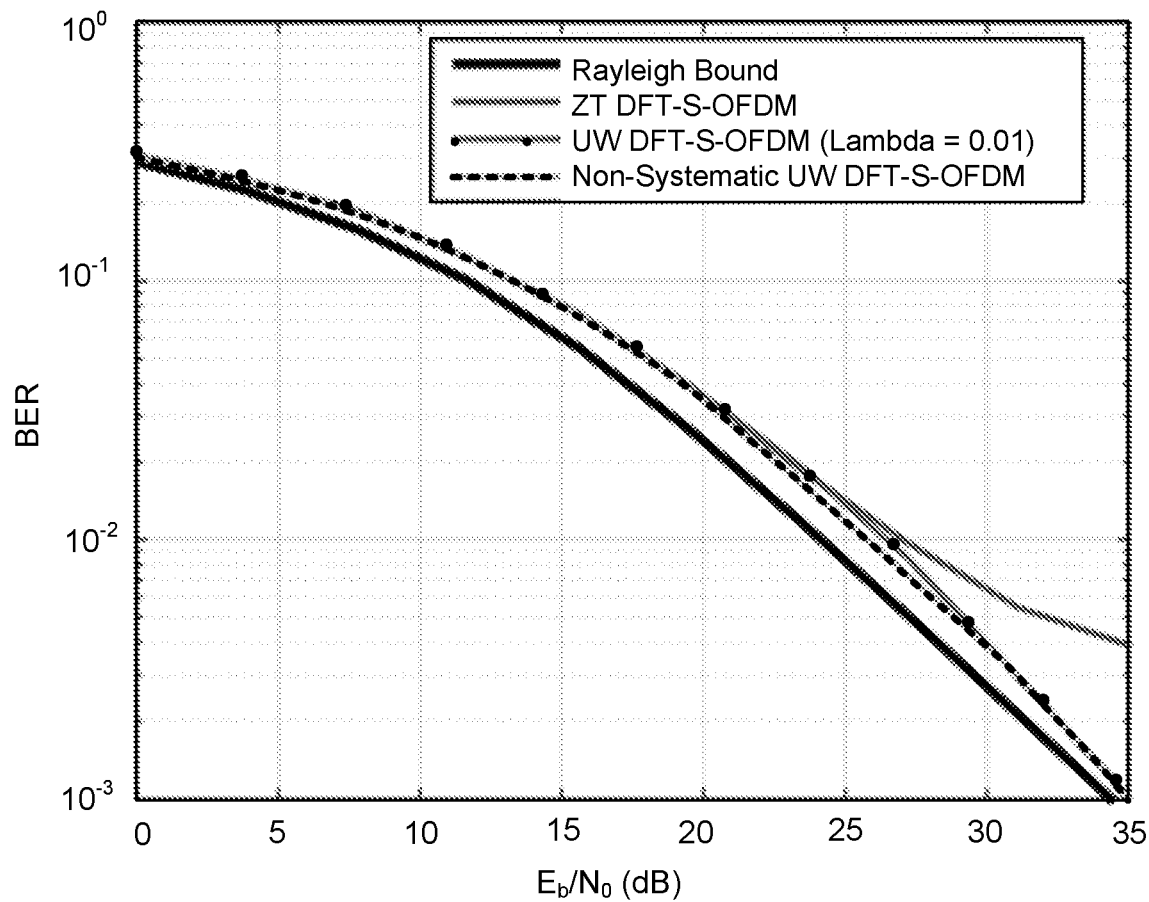
Figure 22A:
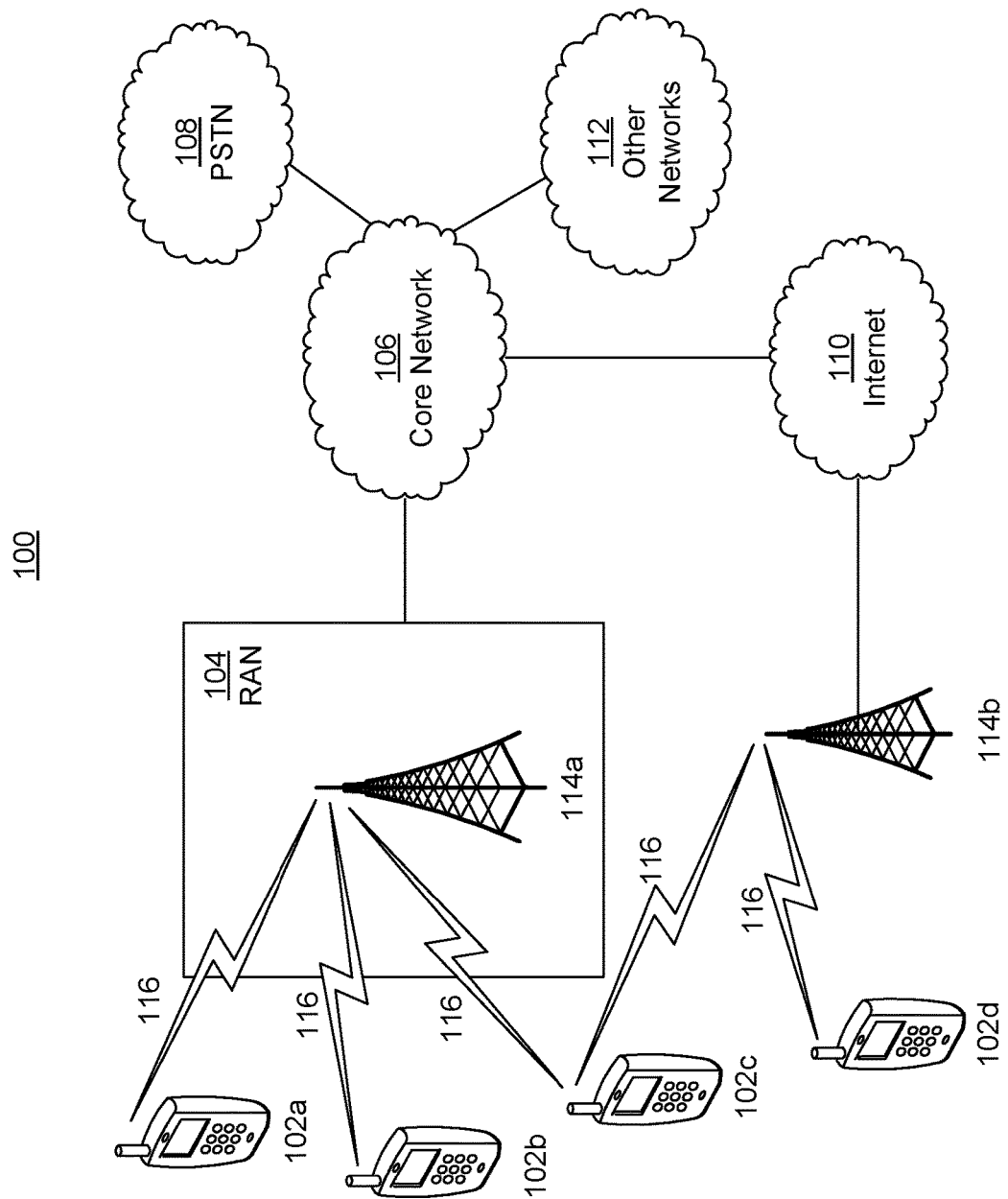
Figure 22B:
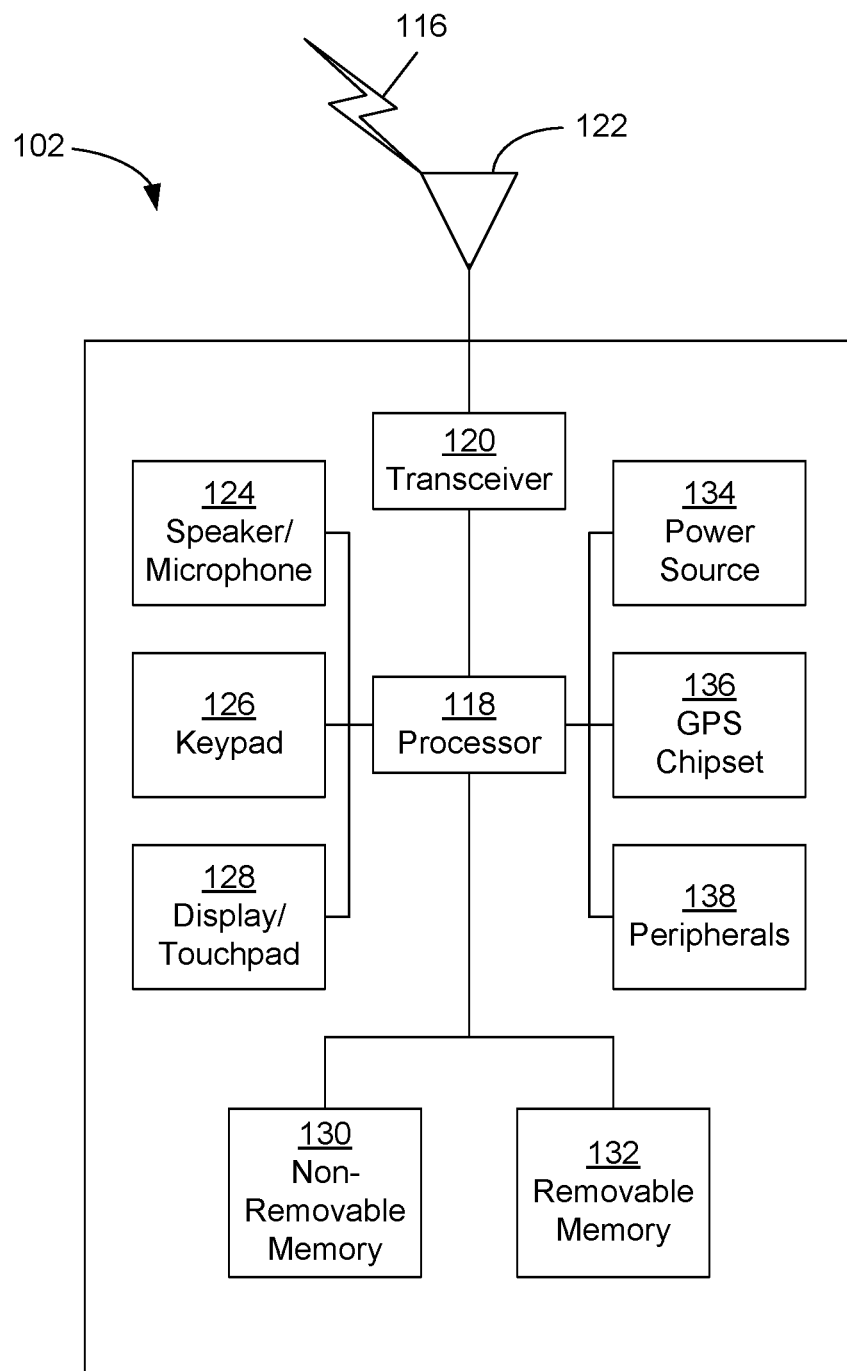

OFDM, and non-systematic complex coded UW DFT-S-OFDM for a filter length of 128 according to simulations;

FIG. 17A is a graph showing a comparison of average energy for CP OFDM, ZT DFT-S-OFDM, UW DFT-S-OFDM, and non-systematic complex coded UW DFT-S-OFDM with UW for a filter length of 64 according to simulations;

FIG. 17B is a graph showing a comparison of average energy for CP OFDM, ZT DFT-S-OFDM, UW DFT-S-OFDM, and non-systematic complex coded UW DFT-S-OFDM with UW for a filter length of 128 according to simulations;

FIG. 18A is a graph showing a comparison of power spectral density for CP OFDM, ZT DFT-S-OFDM, UW DFT-S-OFDM, and non-systematic complex coded UW DFT-S-OFDM with UW for a filter length of 64 according to simulations;

FIG. 18B is a graph showing a comparison of power spectral density for CP OFDM, ZT DFT-S-OFDM, UW DFT-S-OFDM, and non-systematic complex coded UW DFT-S-OFDM with UW for a filter length of 128 according to simulations;

FIG. 19 is a graph showing a comparison of Peak-to-Average Power Ratio (PAPR) for CP OFDM, ZT DFT-S-OFDM, UW DFT-S-OFDM, and non-systematic complex coded UW DFT-S-OFDM with UW for a filter length of 64×2 4QAM according to simulations;

FIG. 20 is a graph showing a comparison of Bit Error Rate (BER) in a 4QAM Additive White Gaussian Noise (AWGN) channel for CP OFDM, ZT DFT-S-OFDM, UW DFT-S-OFDM, and non-systematic complex coded UW DFT-S-OFDM according to simulations;

FIG. 21 is a graph showing a comparison of Bit Error Rate (BER) in a 256QAM exponentially decaying channel for CP OFDM, ZT DFT-S-OFDM, UW DFT-S-OFDM, and non-systematic complex coded UW DFT-S-OFDM according to simulations;

FIG. 22A is a system diagram illustrating an example communications system in which one or more disclosed embodiments may be implemented;

FIG. 22B is a system diagram illustrating an example wireless transmit/receive unit (WTRU) that may be used within the communications system illustrated in FIG. 22A according to an embodiment.

Figure 22C:
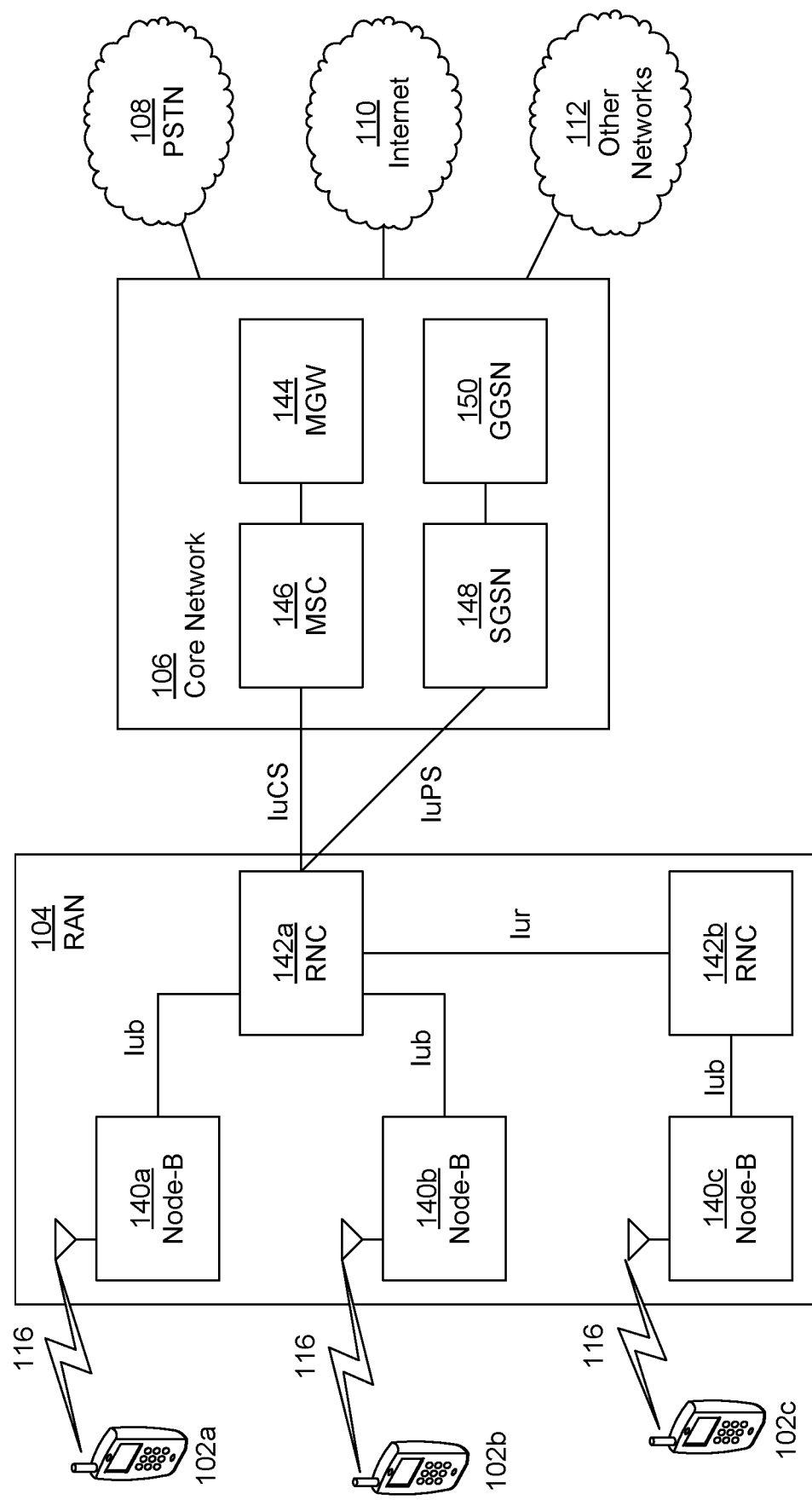

FIG. 22C is a system diagram illustrating an example radio access network and another example core network that may be used within the communications system illustrated in FIG. 22A according to an embodiment.

Figure 22D:
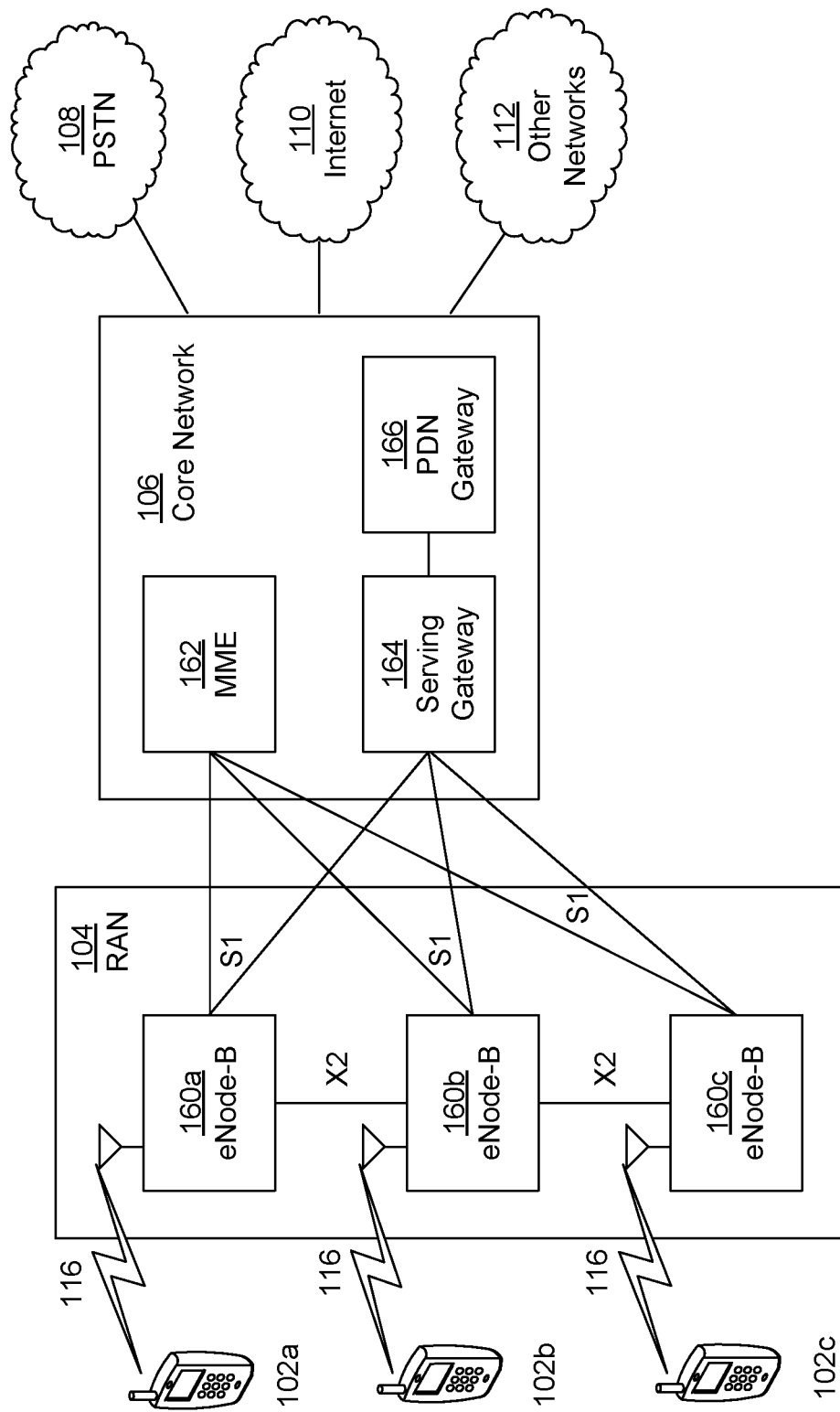

FIG. 22D is a system diagram illustrating another example radio access network and another example core network that may be used within the communications system illustrated in FIG. 22A according to an embodiment.

Figure 22E:
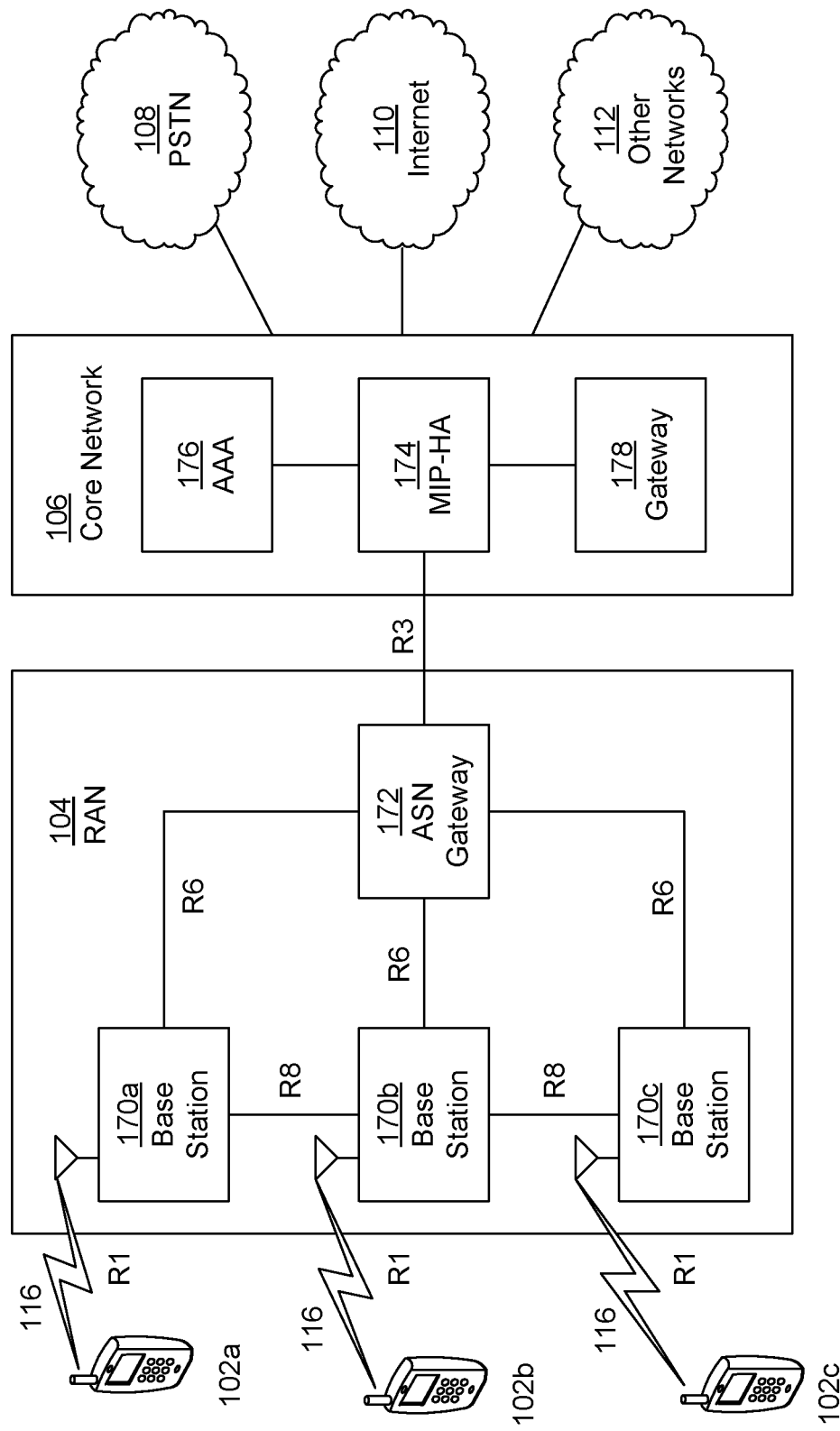

FIG. 22E is a system diagram illustrating a further example radio access network and a further example core network that may be used within the communications system illustrated in FIG. 22A according to an embodiment.

DETAILED DESCRIPTION

1 Introduction

Among many other waveform designs, the schemes that allow block transmissions (i.e., limited in both time and frequency domain) such as CP-OFDM (Cyclic Prefix—Orthogonal Frequency Division Multiplexing), CP (cyclic prefix) single-carrier (SC), DFT-S-OFDM (Discrete Fourier Transform—Spread-OFDM), and generalized frequency division multiplexing (GFDM) (references [7, 8]) are the most prominent candidates for next generation wireless communication systems. These schemes allow low-complexity equalizers with Fourier transformations, support multiple users and multiple antenna systems, and offer good time containment. Nevertheless, those schemes introduce some redundancy to their structures, i.e., the CP, which converts linear convolution of the transmitted signal with the channel impulse response to circular convolution, which simplifies the receiver structure significantly since it allows frequency domain equalization methods. Yet, it leads to underutilized symbol energy at the receiver since the receiver discards the CP part of the symbols and causes extra power consumption at the transmitter side. For example, the redundancy of the CP portion of IEEE 802.11a/g/n/ac symbols is ¼th of the symbol duration, but is then discarded at the receiver to simplify equalization.

Figure 1:
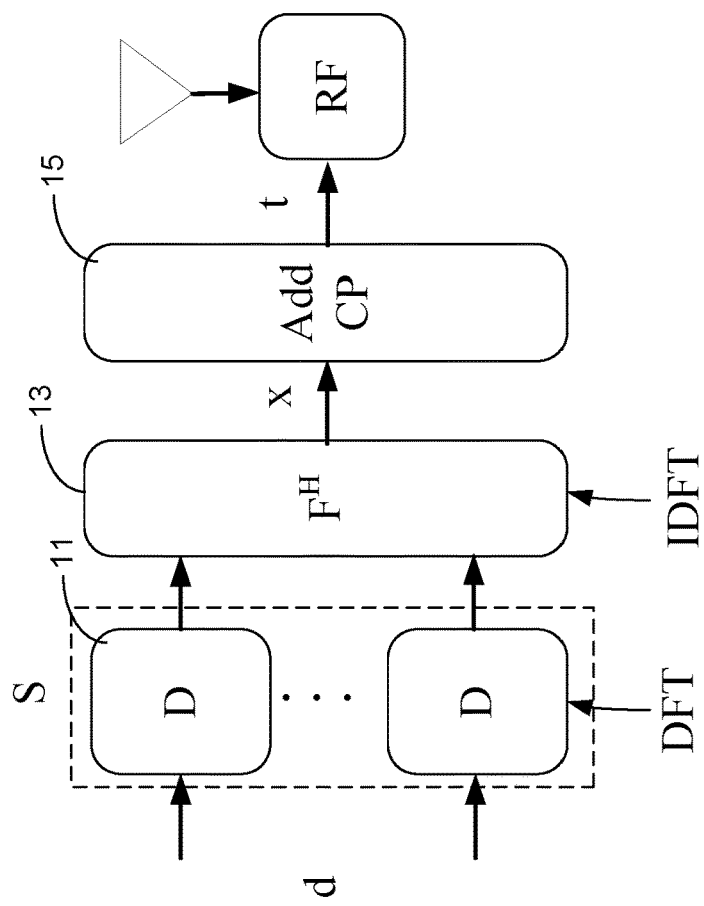
FIG. 1 is a block diagram illustrating a standard DFT-S-OFDM transmitter structure.

Since waveform structures for next generation high frequency communication systems over wideband channels require low peak-to-average power ratio (PAPR) characteristics to achieve high power amplifier (PA) efficiency, single carrier waveform structures are therefore better suited to manage PA efficiency issues than multicarrier structures such as OFDM and filter bank multicarrier (FBMC) systems. On the other hand, traditional single carrier schemes do not allow upper layers to harness multi-user diversity effectively. Considering these issues, DFT-spread OFDM (DFT-S-OFDM), which is illustrated in FIG. 1, and its variations would be a strong waveform candidate in future communications systems. In FIG. 1, D 11 is the DFT matrix and $F^H$ 13 is the inverse DFT matrix). The CP is added at 15.

The following sections discuss schemes that replace the functionality of CP by applying an approach called unique word (UW), while maintaining the benefits of CP structures.

1.1 Scheme: Zero-Tail DFT-S-OFDM

Figure 2:
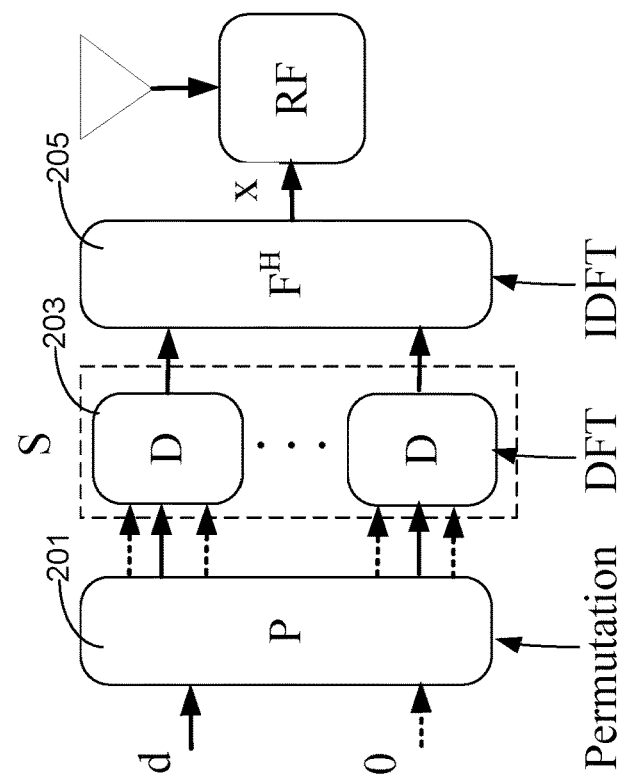
FIG. 2 is a block diagram illustrating a ZT DFT-S-OFDM transmitter structure.

The Zero-Tail DFT-S-OFDM structure disclosed in references [1-3] generates DFT-S-OFDM symbols where the power in the tail of each block in the time domain is 15-20 dB less than that of the data part. As long as the preceding DFT-S-OFDM symbols follow the same structure, the tail of DFT-S-OFDM yields the circular convolution of the channel approximately. It therefore allows frequency domain equalization (FDE) while eliminating the use of CP. FIG. 2 shows the transmitter structure for Zero Tail (ZT) DFT-S-OFDM. In FIG. 2, P 201 is a permutation matrix, D 203 is the DFT matrix, and F 205 is the inverse DFT matrix.

The ZT scheme relies on the zero symbols at the head and tail of the inputs of DFT spreading blocks. Those zeroes yield near-zero samples at the tail of the block (output of the IDFT) while allowing leakage from the data part. The obtained tail serves as a guard interval (GI) between the data parts of the OFDM symbols to mitigate inter-symbol interference (ISI) and interference due to time misalignment between transmitters. In the multi-user case, this scheme also offers low-complexity adaptive GI utilization by simply placing different numbers of zeroes into DFT-spread blocks. However, this scheme suffers from tails with non-zero number of samples which are dependent upon the data transmitted. When the symbols pass through the multipath channel, the non-zero tail of each block leaks into the following symbol and does not maintain the circular convolution of the channel. Hence, the scheme is inherently interference-limited in multipath scenarios as long as a sophisticated equalizer is not considered at the receiver. In addition, a tail with low power samples may not be preferable at the receiver as it affects automatic gain control and phase tracking performance.

1.2 Scheme: UW-OFDM

Figure 3A:
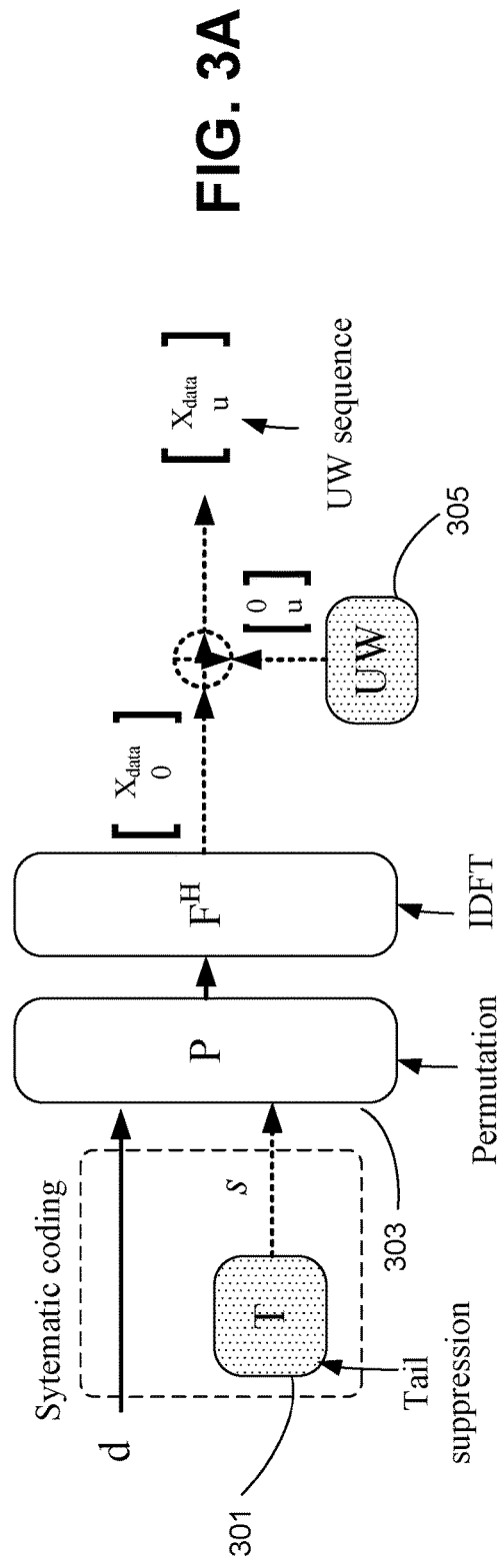
FIG. 3A is a block diagram illustrating a UW-OFDM transmitter structure with tail suppression with systematic complex coding.

The Unique Word-Orthogonal Frequency Division Multiplexing (UW-OFDM) scheme in references [4] and [5] yields perfect zero samples at the tail of each OFDM symbol and adds extra fixed samples, i.e., UW, to the symbol tail. In order to generate samples that are exactly zero at the tail of each OFDM symbol, this scheme introduces a set of redundant subcarriers. The redundant subcarriers are then modulated with values generated by a tail suppression block 301 as illustrated in the FIG. 3A. This block calculates a suppression vector s from data vector d and uses permutation matrix P 303 to map the elements of s to the redundant subcarriers. As this approach does not distort the data symbols, it is referred to as systematic complex coding. After the signal $x_{data}$ is generated, a fixed UW 305, i.e., vector u, is added to the tail of the OFDM symbol. At the receiver side, the UW will be subtracted after the equalization operation.

The main disadvantage of UW-OFDM is that the perfect zero tail generator generates very large values. In other words, the norm of the elements of the vector s can be very large, which translates into high power consumption and distortion due to the quantization errors in practical implementations. In order to avoid this issue, one option is to optimize the permutation matrix P, i.e., the location of redundant subcarriers. However, the optimization of P is a non-deterministic polynomial-time (NP)-hard problem and requires exhaustive search among all possible solutions. In the literature, heuristic algorithms for P are available.

Figure 4:
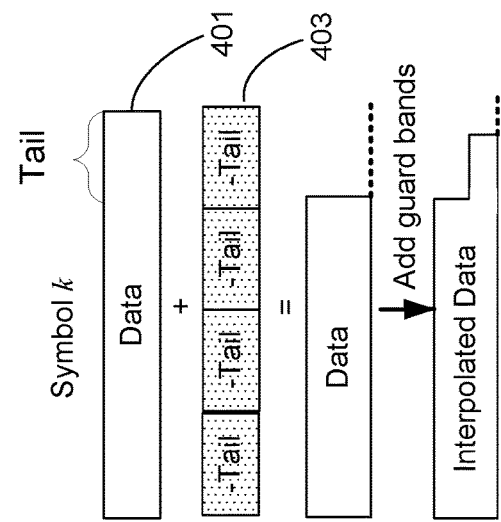
FIG. 4 is a diagram illustrating tail cancellation in accordance with the scheme of FIG. 3A.

In order to remove the tail part of each symbol, one of the properties of DFT (i.e., DFT of a periodic sequence in the time domain yields a frequency response where only the bins other than the interleaved ones are zero) is exploited. As illustrated in FIG. 4, this approach suggests that the tail part of each symbol is first repeated in the time domain and the repeated signal 403 is subtracted from the original signal 401. As a result, the tail part of the original signal is cancelled exactly. As the tail cancellation signal has a repeating response in time, its frequency response has an interleaved structure. Hence, this solution offers an effective method for calculating the redundant symbols on the interleaved subcarriers without using a precoding matrix of UW OFDM, which may simplify the transmitter structure.

Figure 3B:
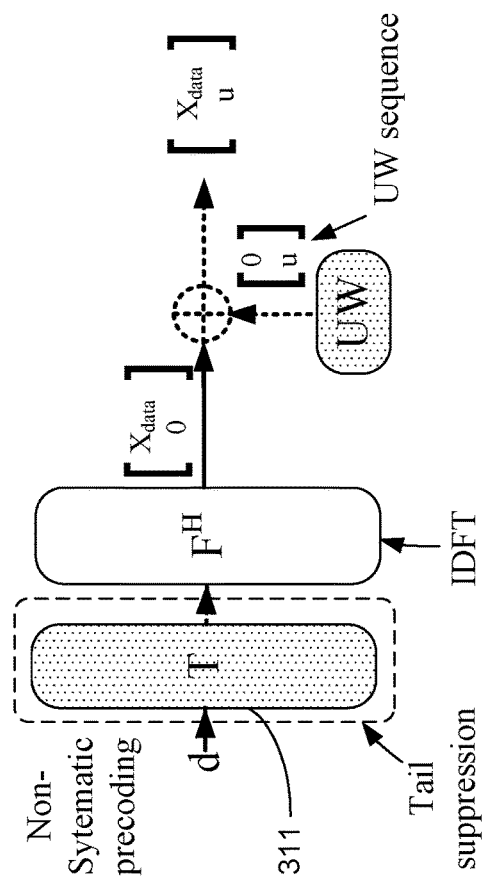
FIG. 3B is a block diagram illustrating a UW-OFDM transmitter structure with tail suppression with non-systematic complex coding.

In order to cancel the tail, another option is to distort all subcarriers to generate the zero tail, which is referred to as non-systematic complex coded approach in reference [5], and is illustrated in FIG. 3B. This approach leads to a high complexity receiver (as the suppression signal 311 is applied to all the data sub-carriers). To best of our knowledge, there exist no solution that yields a low complexity implementation for non-systematic complex coded approach.

1.3 Scheme: UW-DFT-S-OFDM

Figure 5:
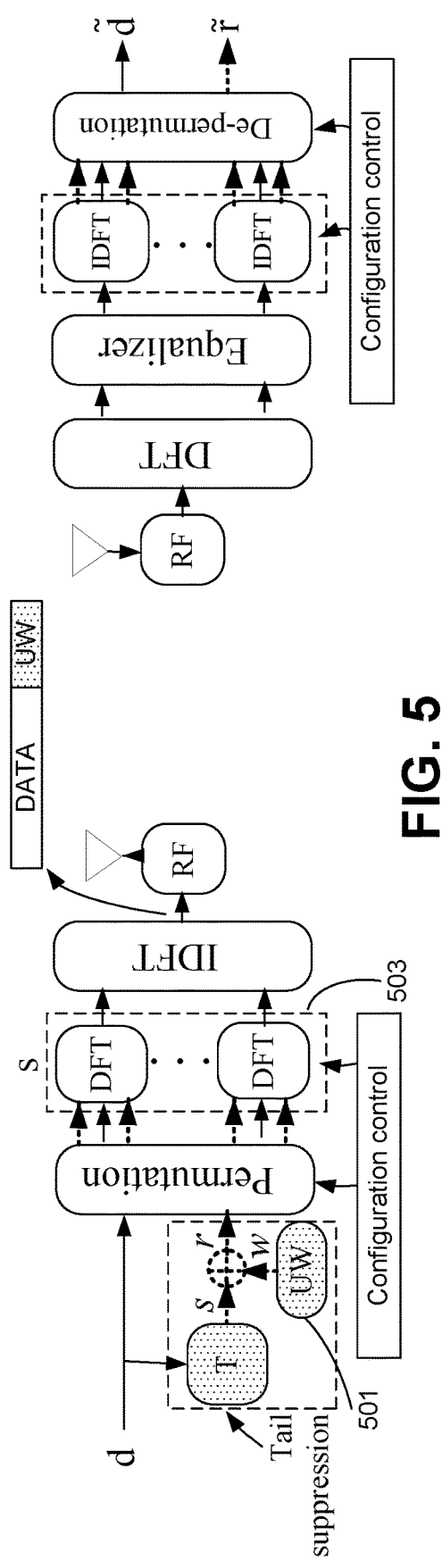
FIG. 5 is a block diagram illustrating a UW DFT-S-OFDM transmitter structure and receiver structure.

In references [9, 10], a waveform based on DFT-S-OFDM, in which the tail of the DFT-S-OFDM symbol contains a fixed sequence, i.e., a unique word (UW), is proposed. FIG. 5 illustrates an exemplary transmitter and receiver for UW DFT-S-OFDM. The proposed waveform improves upon both existing ZT DFT-S-OFDM and UW OFDM schemes by removing the impact of data symbols on the tail of the transmitted signal. This is done by creating a redundant symbol vector that has approximately 1% of the total transmitted energy. As a result, the UW DFT-S-OFDM scheme proposed in [9, 10] keeps many advantages of UW OFDM and ZT DFT-S-OFDM, such as the circular convolution of the channel without the use of a cyclic prefix (CP), low peak-to-average power ratio (PAPR), and low out-of-band (OOB) emission. In addition, the scheme enables the use of a simpler receiver because the UW sequence 501 is inserted at the input of the DFT process 503 (as opposed to being added in the time domain at the IDFT output, as in references [4] and [5]). In addition, the proposed method allows frequency selective link adaptation via DFT-spread based physical resource block. Hence, it also addresses the multiple accessing scenarios in the uplink and downlink.

1.4 Scheme: Perturbated Static DFT-S-OFDM

Figure 6B:
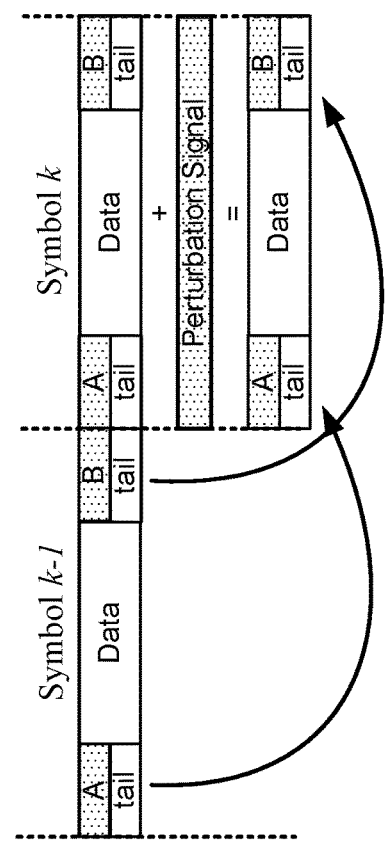
FIG. 6B is a diagram illustrating tail cancellation in accordance with the scheme of FIG. 6A.
Figure 6A:
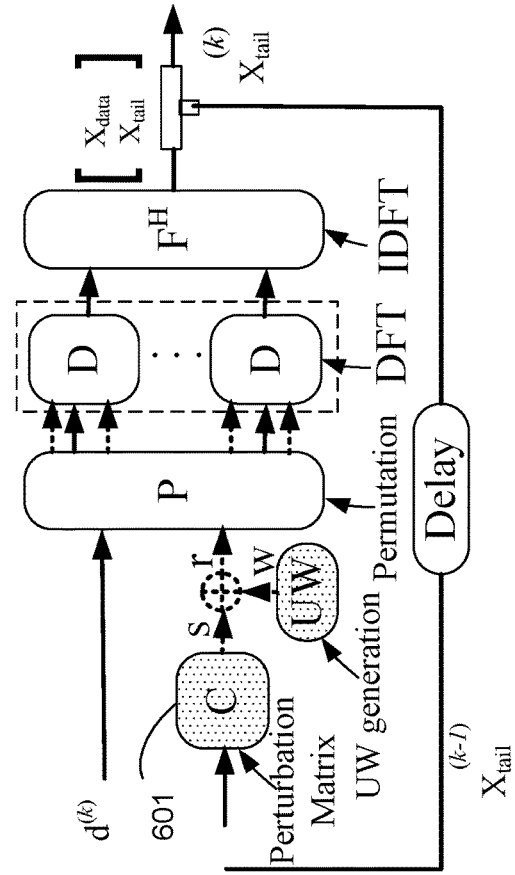
FIG. 6A is a block diagram illustrating a static DFT-S-OFDM transmitter structure.

Reference [11] proposes a method that follows a rationale that maintains the phase continuity between two consecutive DFT-S-OFDM symbols by using ZT DFT-S-OFDM structure. The main goal of this scheme is to suppress the Out of Band (OOB) leakage. The proposed method suggests adding a perturbation vector 601 to the current DFT-S-OFDM symbol such that it will yield similar samples to that of previous DTF-S-OFDM symbol for the head and tail parts. The transmitter structure is illustrated in FIG. 6A and the composition of the transmitted signal is illustrated in FIG. 6B. This diagram illustrates that the head and the tail parts of the kth symbol becomes similar to that of (k−1)th symbol by adding a perturbation signal to the symbol k.

1.5 Notation

The following notation is used throughout this document:

Matrices [columns vectors] are denoted with upper [lower] case boldface letters (e.g., A and [a]). The Hermitian operation and the transpose operation are denoted by $(\bullet)^H$ and $(\bullet)^T$, respectively. The Moore-Penrose pseudoinverse operation and inverse operation are denoted by $(\bullet)^\dagger$ and $(\bullet)^{-1}$, respectively. The operation of $\|\bullet\|_2$ is the 2-norm of its argument. The trace of a square matrix is represented by tr($\bullet$). The field of complex numbers and the field of real numbers are shown as $\mathbb{C}$ and $\mathbb{R}$, respectively. $I_N$ and $0_{N \times M}$ are the N×N identity matrix and N×M zero matrix, respectively. The Kronecker product is represented by $\otimes$, and $1_{N \times M}$ represents the N×M all one matrix.

In the context of the waveform development for 5G systems, UW-based OFDM waveforms (as described above) have been proposed to replace the CP with a known sequence (the UW) to be used for synchronization, phase tracking, and channel estimation purposes. However, existing UW OFDM waveforms have high transmitter and receiver complexity.

Disclosed below is a UW DFT-S-OFDM structure that addresses the high complexity issue of UW OFDM waveforms and the high OOB emissions and high PAPR issues of CP-OFDM.

2 Embodiments

2.1 Non-Systematic Complex Coded UW DFT-S-OFDM

This section introduces a non-systematic complex coded waveform structure in which the data symbols are distorted intentionally.

This scheme addresses the high complexity problem mentioned above by adding a periodic distortion signal to the data symbols that exploits the properties of the periodic sequences in the frequency and time domains. The impact of the distortion is removed at the receiver by observing one period of the distortion signal to determine the distortion vector and then removing the distortion from the incoming signal. The proposed scheme introduces a DFT-based precoder for the tail suppression as the periodic distortion can be generated by simply discarding the interleaved bins in one domain.

This scheme also addresses the high OOB and high PAPR issue of CP-OFDM. Specifically, in order to increase the contiguity between the symbols, a frequency domain filtering introduces UW at the two edges of the symbols while concentrating the data symbols in the middle of the symbol.

2.1.1 Tail Cancellation Operation

Figure 7:
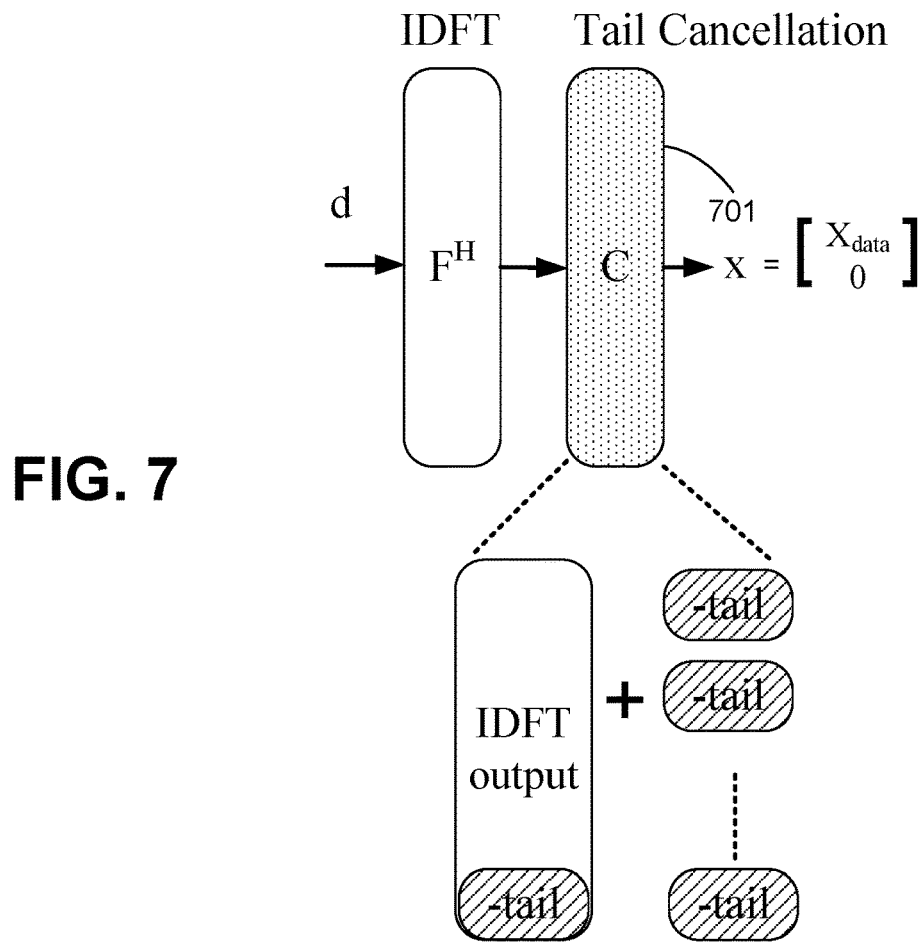
FIG. 7 is a block diagram illustrating tail cancellation at the transmitter in accordance with a first embodiment.

Consider a scenario where a block of data symbol denoted by $d \in \mathbb{C}^{N \times 1}$ is transmitted as $$x = CF^H d, \quad (1)$$

where $F \in \mathbb{C}^{N \times N}$ is the DFT matrix and $C \in \mathbb{C}^{N \times N}$ is the tail cancellation matrix. The matrix C is explicitly given by $$C = I_N + \left[ 0_{N \times N-G} \quad -1_{\frac{N}{G} \times 1} \otimes I_G \right],$$

where G is the size of the tail cancelled by the matrix C. The tail size may be configured as a function of the channel delay spread and/or of the target length of the UW, if the UW is used for synchronization purposes. Additionally, the tail size G is chosen such that $$\frac{N}{G}$$

is an integer. The operation of the tail cancellation block 701 is illustrated in FIG. 7.

Figure 8:
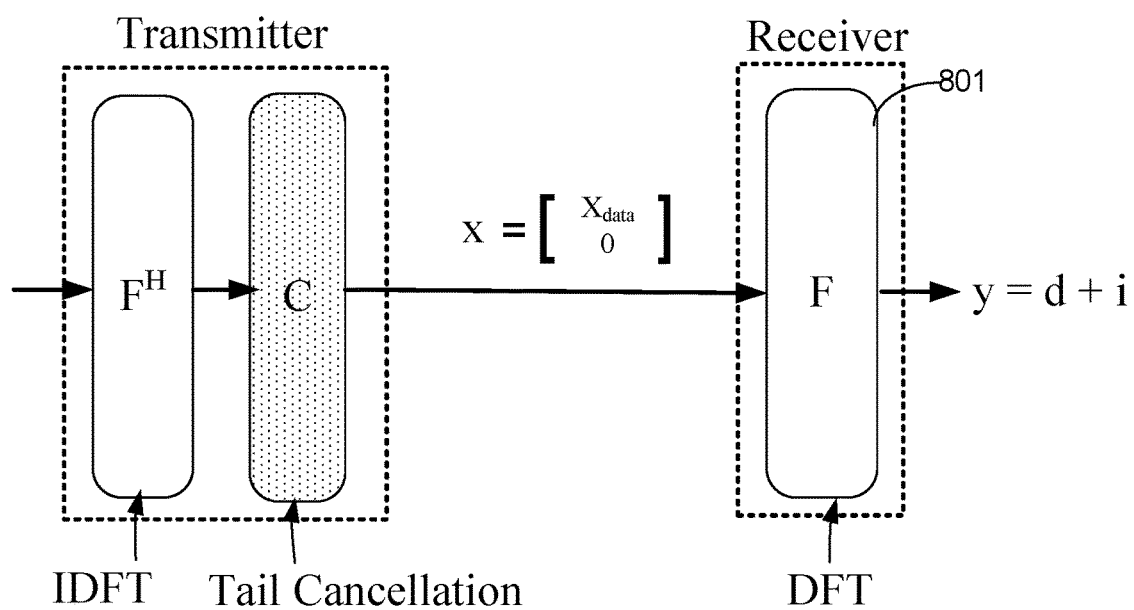
FIG. 8 is a block diagram further illustrating the receiver in connection with the tail cancellation process.

Assuming an ideal channel between the transmitter and the receiver, the symbols at the output of the receive DFT block 801 (see FIG. 8), i.e., $y \in \mathbb{C}^{N \times 1}$, can be calculated as $$y = Fx = FCF^H d = d + \underbrace{\left[ 0_{N \times N-G} \quad F\left(-1_{\frac{N}{G} \times 1} \otimes I_G\right) \right] F^H d}_{i}. \quad (2)$$

By evaluating equation (2) further, the interference term $i \in \mathbb{C}^{N \times 1}$ due to the tail cancellation block can be obtained as $$i = F\left(-1_{\frac{N}{G} \times 1} \otimes I_G\right) x_{tail} = -F\underbrace{\left(1_{\frac{N}{G} \times 1} \otimes x_{tail}\right)}_{repetition}, \quad (3)$$

where $x_{tail} \in \mathbb{C}^{G \times 1}$ is the tail part of the vector $F^H d$, which is cancelled by the matrix C at the transmitter. As can be seen in equation (3), the Kronecker product causes a periodic self-interference pattern in the time domain. Since the DFT of a periodic signal has non-zero elements only on the interleaved bins, the vector i only distorts the interleaved subcarriers with indices $$\left\{ 0, \frac{N}{G}, \frac{2N}{G}, \ldots, \frac{(G-1)N}{G} \right\}.$$

As a result, the tail cancellation operation in equation (1) causes interference with the data symbol on the interleaved subcarriers and it may in itself lead to the need for a complex receiver structure.

A low complexity waveform structure to avoid the interference the tail cancellation block creates on the interleaved subcarriers is described hereinafter. To this end, a DFT-spread OFDM structure which employs the same tail cancellation block is utilized and a method that pushes the data symbols away from the interleaved subcarriers is developed. The proposed scheme is described in detail in the following sections.

2.1.2 Proposed Scheme for Generating Non-Systematic UW DFT-S OFDM

With reference to FIG. 9, which is a functional block diagram of a transmitter system in accordance with one embodiment, let a block of QAM modulated symbols to be transmitted be the vector $d \in \mathbb{C}^{N_d \times 1}$, where $N_d$ is the number of modulation symbols in the block. In order to map the data symbols to the inputs of DFT-spread blocks 905 in a certain way (described in more detail below in section 2.1.3), the data symbols are permutated (901 in FIG. 9) with a permutation matrix $P \in \mathbb{C}^{L \times N_d}$, where L is the total degrees-of-freedom for the data symbols. In the proposed scheme, DFT spread blocks 905 are denoted by $D_k \in \mathbb{C}^{M_k \times M_k}$, where $M_k$ is the size of the kth DFT matrix. Without loss of generality, we consider K DFT spread blocks that operate in parallel, which can also be stacked into a larger spreading matrix (907 in FIG. 9) $S \in \mathbb{C}^{L \times L}$ where $L = \Sigma_{k=1}^K M_k$. After the DFT-spread operations, the processed samples in frequency are transformed to time domain via inverse discrete Fourier transformation matrix $F^H \in \mathbb{C}^{N \times N}$ (909 in FIG. 9).

In the proposed scheme, in order to avoid the interference occurring after the tail cancellation block, the inputs of DFT-spread blocks 901 are intentionally distorted (903 in FIG. 9) with a distortion vector $r \in \mathbb{C}^{L \times 1}$ such that the outputs of DFT-spread blocks 901 that drive the interleaved inputs of the IDFT block $F^H$ 905 are nulled or suppressed.

In order to calculate such a distortion vector r, we consider a linear precoder 903 which functions as $$r = Td,$$

where $T \in \mathbb{C}^{L \times N_d}$ is a precoding matrix that generates the distortion vector r based on the data symbol vector d. As discussed in Section 2.1.1, the goal of the distortion vector r in this scheme is to suppress the signal on the interleaved subcarriers which would be interfered with after the tail cancellation operation.

After the tail cancellation operation 911, the resulting signal in the time domain can be expressed as $$x = \begin{bmatrix} x_{data} \\ 0 \end{bmatrix} = CF^H S(Pd + r) = CF^H S(Pd + r),$$

where $x \in \mathbb{C}^{N \times 1}$ is the signal vector in time domain.

Zero-symbols are merely an example. The symbols that are inserted at the input to the DFT may be any sequence that is known by the receiver (either through signaling or a system specification). For instance, as long as the receiver is aware of the sequence, the inserted symbols may all be is or 1, 2, 3, 4, 5, . . . .

2.1.3 Calculation of the Distortion Vector

Without any distortion on the data symbols, the information on the interleaved subcarriers can be expressed as RSPd, where R is the matrix that selects the output of DFT-spread blocks 905 that corresponds to the interleaved subcarriers index. In order to push the data symbol away from corresponding interleaved subcarriers, the distortion vector r, should suppress the information on the interleaved subcarriers as much as possible. Hence, the optimization problem that minimizes the energy of the signals at those interleaved subcarriers, can be expressed as:

$$r = \underset{r'}{\arg\min} \|R(S(Pd + r'))\|_2 \text{ s.t. } \|r'\|_2^2 \leq \alpha \quad (4)$$

where $\alpha$ is an energy constraint on the vector r'. The optimization problem above is known as a least squares with a quadratic constraint (LSQI) problem. To solve this problem, we first examine the unconstrained least squares problem, i.e., without the energy constraint. In this case, the solution can be expressed via the pseudoinverse of RS as $$r = \underbrace{-(RS)^\dagger RSPd}_{T}. \quad (5)$$

If the energy constraint is introduced, equation (4) is equivalent to the following unconstrained problem $$r = \underset{r'}{\arg\min} \|R(SPd + Sr')\|_2^2 + \lambda \|r'\|_2^2,$$

where $\lambda$ is the Lagrange multiplier. In this case, the solution is obtained as $$r = \underbrace{-((RS)^H RS + \lambda I)^{-1} (RS)^H RSPd}_{T} \quad (6)$$

In this scheme, a permutation matrix P that does not map the data symbols to the upper and lower-ends of DFT-spread blocks may be desirable in order to minimize the energy at the tail of the original symbol (i.e., the symbol without tail cancellation operation). The main rationale for this choice is that the lower-end and upper-end inputs of the DFT-spread blocks 905 significantly determines the energy on the tail part of the DFT-S-OFDM symbols. This will simplify the receiver structure as the interleaved subcarrier will be discarded, as will be shown in Section 2.2 below. Hence, the matrix P is constructed such that it does not map the data symbols to $M_{header,k}$ upper-end inputs of DFT-spread block, and $M_{tail,k}$ lower-end inputs of DFT-spread block. It is also worth noting that these unmapped inputs will be interfered with by the distortion vector r, which is a function of d.

An alternative mathematical derivation to the approach shown in FIG. 9 may be based on application of the distortion vector immediately after the DFT function. Hence, similar to the solutions presented by Equations (5) and (6), there are two sets of constrained and unconstrained solutions that can be expressed as follows:

$$\text{Un-constrained solution: } r = \underbrace{-R^\dagger RSPd}_{T} \quad (5a)$$

$$\text{Constrained solution: } r = \underbrace{-(R^H R + \lambda I)^{-1} R^H RSPd}_{T} \quad (6a)$$

The solution given in equations 5 and 6 are equivalent to the solutions in equations 5a and 6a. The post-DFT implementation allows the required computations for T and r to be performed in parallel with the DFT processing. Thus, it may relax the timing constraints on hardware design.

2.2 Low-Complexity Precoder

This section describes enhancements that enable a low complexity precoder.

If $M_k$ is an integer multiple of the number of interleaved subcarriers, i.e., $N_{in,k}$, that corresponds to the kth DFT-spread block, it is possible to express the precoder T in a simple way by exploiting the duality properties of DFT. For example, if the first output of the DFT-spread block corresponds to an interleaved subcarrier in the frequency domain and $N_{in,k}$ is an integer multiple of the size of $M_k$, the precoder matrix is obtained as $$T = -\frac{1}{N_{in,k}} I_{\frac{M_k}{N_{in,k}}} \otimes I_{N_{in,k}}. \quad (7)$$

In other words, the precoder simply averages out the interleaved outputs of the permutated data symbols to calculate the distortion vector r. For example, if the data vector $d=[d_0\ d_1\ d_2\ d_3\ d_4\ d_5\ d_6\ d_7]$, $M_k=8$, and $N_{in,k}=2$; the precoder is then obtained as $$T = -\frac{1}{4} I_4 \otimes I_2.$$

Hence, the distortion vector r is calculated as $$r = -\begin{bmatrix} \frac{d_0 + d_2 + d_4 + d_6}{4} \\ \frac{d_1 + d_3 + d_5 + d_7}{4} \\ \frac{d_0 + d_2 + d_4 + d_6}{4} \\ \frac{d_1 + d_3 + d_5 + d_7}{4} \\ \frac{d_0 + d_2 + d_4 + d_6}{4} \\ \frac{d_1 + d_3 + d_5 + d_7}{4} \\ \frac{d_0 + d_2 + d_4 + d_6}{4} \\ \frac{d_1 + d_3 + d_5 + d_7}{4} \end{bmatrix}. \quad (8)$$

In addition, as shown in equation (8), the distortion vector r has $N_{in,k}=2$ repeating elements, i.e., $$\frac{d_0 + d_2 + d_4 + d_6}{4} \text{ and } \frac{d_1 + d_3 + d_5 + d_7}{4},$$

which can also be exploited in the receiver structure. In general, this special case of distortion vector r is called periodic self-interference in this scheme. It is also worth noting that it is possible to find other distortion vectors in general. However, the precoder T yields the least squares solution, which also minimize the norm of the distortion vector. Therefore, the obtained distortion vector only cancels the interleaved outputs of the DFT block while it does not change the values on the other outputs of the DFT matrix (i.e., the corresponding entries of the distortion vector after DFT-spread are zero) in order to achieve the minimal norm solution. As a result, this property yields a significant reduction in the implementation of the precoder, i.e., the content of the periodic self-interference can be obtained by simply discarding the interleaved subcarriers. This can also be proven by using the proposition given in the Addendum at the end of this specification.

As an example, in FIGS. 10A, 10B, and 10C, one out of every 3 samples in the frequency domain is desired to be nulled. One approach, illustrated by FIG. 10A, is to use the aforementioned linear precoder 1001 that gives the minimal norm solution (or least squares solution) for the distortion vector. As the obtained solution is minimal norm, the frequency response of the distortion vector cancels only the information on the interleaved subcarriers, as shown in FIG. 10A. Due to the duality properties of DFT, the distortion component has a periodic structure in time with the periodicity of $N_{in,k}=3$, which is illustrated in FIG. 10B. By using the aforementioned proposition from the Addendum, the structures shown in FIGS. 10B and 10C are also identical. As a result, the structures given in FIGS. 10A, 10B, and 10C are equivalent to each other.

The block diagram in FIG. 10C enables a very low complexity method of generating the signal, namely by setting every $N_{in,k}$th subcarrier to zero at the input of the IFFT, which is described in the following section.

2.2.1 Low-Complexity Transmitter for Non-Systematic Complex Coded UW DFT-S-OFDM

A more detailed block diagram of DFT 907 and the subsequent portion of the low complexity transmitter of FIG. 9 is shown in FIG. 11.

Based on the discussion above, the proposed low-complexity procedure for the transmitter is as follows:
1. At most, $N_d$ data symbols are stacked in symbol vector d and mapped to inputs of the DFT-spread blocks 905 with the permutation matrix P. Zero-symbols 1101 are inserted to the unmapped inputs of the DFT-spread blocks. Note that these inputs will not be zero after the precoder operation and will be used at the receiver to recover the data symbols. We refer to the information on these inputs (i.e., the inputs on which the zero-symbols were inserted) as the observable distortion components;
2. The outputs of the DFT-spread blocks 905 are calculated;
3. The outputs of the DFT blocks that correspond to the interleaved subcarriers are discarded and replaced with zeroes 1103;
4. IDFT operation 909 is applied on the modified data;
5. Tail is cancelled with the tail cancellation block 1105;
6. Guard bands and UW are added at 1107; and
7. Generated symbol is transmitted through the transmit antenna 1109.

2.3 Low-Complexity Receiver for Non-Systematic Complex Coded UW DFT-S-OFDM

In order to remove the self-interference at the receiver side, the periodicity of interfering content is exploited. As mentioned above, a part of the distortion vector data will appear at the output of the lower-end of the IDFT-spread blocks. Since the distortion is a periodic sequence, the complete distortion vector can be restored by observing only one of its periods. Then, the data symbols can be recovered by using the subtraction operations, as illustrated in FIG. 12. In this scheme, the transmitter and the receiver have to know the location of the aforementioned observable distortion components.

The receiver operations are given as follows:
1. The DFT-S-OFDM symbol is received through the receive antenna 1201;
2. DFT of the receiver symbol is calculated (1203);
3. The interleaved subcarriers are discarded (1205) and replaced with zeros as the tail cancellation block interferes with these subcarriers; and
4. The periodic interference is calculated using the observable distortion components and subtracted from the other bins (1207).

The variables that enable the receiver configuration are given as follows:
Location of observable distortion components
$N_{in,k}$, $M_k$, $M_{head,k}$, $M_{tail,k}$, N, G. The information may be pre-defined or signaled (with the control signaling associated with the resource assignment)

2.4 Guard Bands and Unique Word Generation for Non-Systematic Complex Coded UW DFT-S-OFDM Structure In order to control the sidelobes of the waveform and maintain a low-order anti-aliasing filter at RF, guard bands should be included in the baseband waveform. The structure illustrated on the left in FIG. 13 is an exemplary embodiment of a transmitter comprising substantially the transmitter structure of FIG. 11 with UW addition (1301) and guard band insertion (1303) that captures the low-complexity implementation of the non-systematic complex coded UW DFT-S-OFDM discussed in Section 2.1. The structure illustrated on the right in FIG. 13 is an exemplary embodiment of a corresponding receiver comprising substantially the receiver structure of FIG. 12 with UW extraction (1311).

As a traditional pulse shaping approach, the guard bands may be added by 1) up-sampling, 2) filtering, and 3) down-sampling operations.

As opposed to the traditional approach, the following guard band and UW addition method allows circular convolution and considers a padding operation with fixed sequence.

As an implementation, the guard bands also may be added by using the fact that a filtering operation in the time domain is equivalent to a multiplication operation in the frequency domain. In the frequency domain, the filtering operation may be enabled through the following procedure:
1) DFT of the signal is calculated and it is repeated in frequency;
2) DFT of the zero padded filter impulse response is calculated;
3) Frequency response of the filter and the repeated frequency response of the signal are multiplied; and
4) The resulting discrete signal is converted to the time domain.

It is worth noting that these operations require zero-paddings for both the signal and the filter before the calculations of their frequency responses. The main rationale for zero padding is not to allow a circular convolution due to the DFT operations.

With reference to FIG. 14, let $N_b = o \times N$ be the size of the IDFT operation for the pulse shaping, where o is the upsampling rate. As opposed to zero padding, the signal is padded with a fixed sequence, which is UW. This operation destroys the aforementioned relationship between multiplication in the frequency domain and the convolution operation in the time domain. However, this operation yields a UW sequence at the head and tail part of each symbol due to the circular convolution due to the DFT. Yet, it does not hurt the contiguity between the symbols. This is because the modulated pulse shapes with the fixed samples of UW of the consecutive UW DFT-S-OFDM symbols complement each other. The lower-end of the DFT-spread block are fixed with a UW sequence.

The overall transmitter and receiver structure is illustrated in FIG. 15. As the UW is generated by using different inputs of DFT-spread block, UW also does not need to be known in advance at the receiver side, which also brings extra advantage as compared to existing schemes. As compared to systematic UW DFT-s-OFDM [9, 10], UW is not distorted with this proposed scheme.

It should be noted that, while periodic interleaving has certain advantages as discussed above (e.g., a low complexity receiver), it is not absolutely required. The inability to take advantage of the periodicity property to restore the complete distortion vector by observing only one of its periods may lead to the need for a more complex receiver. However, the basic technique remains similar.

3 Numerical Results

In this section, we compare the proposed non-systematic complex coded UW DFT-S-OFDM scheme with CP OFDM, ZT DFT-S-OFDM (references [1-3]), and systematic UW DFT-S-OFDM (references [9,10]) through simulations using MatLab. As an example, we set N=512 subcarriers, L=512, and a CP length of 64 samples. Also in this example, the length of the UW is set at $N_{tail}$=64 samples. We consider K=4 identical DFT spreading blocks where $M_k$=128 for k=1, 2, . . . , 4. For each DFT-spread block, we set $M_{tail,k}$=16 and $M_{header,k}$=1, which yields $N_d$=K×M−K×($M_{tail,k}$+$M_{header,k}$)=512−17×4=444 data symbols. The vector r is calculated based on equation (1). The multipath channel is modeled as an exponential Rayleigh fading channel with $\mathcal{L}$=$N_{tail}$+1 independent taps and power delay profile (PDP) where the un-normalized power of the lth tap is expressed as exp(−τl), where τ corresponds to the decay rate. Note that τ=0 yields a uniform PDP. The oversampling factor o is set to 2, which yields $N_b$=2×N=1024 (i.e., 256 guard subcarriers at the edges of the band). For the filter length, we consider two root raised cosine filters, where their filter lengths are 64 and 32 periods. The oversampling rate and the roll-off factor for both filters are fixed to 2 and 0.05, respectively. The filter is also applied to ZT DFT-S-OFDM and systematic UW DFT-S-OFDM for a fair comparison. The modulation order is set to 4QAM unless otherwise stated.

3.1 Time Samples without UW

In FIGS. 16A and 16B, the average energy of the samples is provided for (1) CP OFDM, (2) ZT DFT-S-OFDM, (3) UW DFT-S-OFDM, and (4) Non-systematic complex coded UW DFT-S-OFDM. In order to compare the tails of the schemes, the UW signal is not included. As shown in FIGS. 16A and 16B, CP OFDM utilizes 1024+128 samples in time, while the ZT DFT-S-OFDM and the proposed UW DFT-S-OFDM scheme both utilize 1024 samples. UW DFT-S-OFDM achieves suppressed samples at the tails of DFT-S-OFDM symbols as compared to the ZT DFT-S-OFDM. Since the power of the tail part is 15 dB lower than that of the non-tail part for ZT DFT-S-OFDM and changes depending on the data, ISI can be a limiting factor for this scheme in a rich scattering environment. In contrast, the UW DFT-S-OFDM [9, 10] obtains a tail which is 35-40 dB lower than the non-tail part and improves the tail characteristics of the scheme. On the other hand, the non-systematic complex coded UW DFT-S-OFDM structure cancels a part of the tail completely and the rest of the part is used for accommodating the half of the filter length. In FIG. 16A, the filter length is 64 and it rapidly decays within the tail region of the symbol. In FIG. 16B, the filter length is 128, which is the maximum affordable filter length as the UW length is 128 samples.

3.2 Time Samples with UW

In FIGS. 17A and 17B, the average energy of the samples is provided for (1) CP OFDM, (2) ZT DFT-S-OFDM, (3) UW DFT-S-OFDM, and (4) non-systematic complex coded UW DFT-S-OFDM with UW for UW lengths of 64 and 128, respectively. As discussed in 2.4, the UW appears on the edge of the time samples. However, this does not hurt contiguity between the symbols.

3.3 OOB Leakage

In FIGS. 18A and 18B, the power spectrum for (1) CP OFDM, (2) ZT DFT-S-OFDM, (3) UW DFT-S-OFDM, and (4) non-systematic complex coded UW-DFT-S-OFDM are provided for filter lengths of 64 and 128, respectively. The Welch's averaged periodogram method is utilized to estimate the power spectrum. Since the upper-end of the DFT-spreading blocks are set to zero for the ZT DFT-S-OFDM and small values generated based on data for the proposed scheme, the symbol transitions are smoothed for both schemes. Therefore, the ZT DFT-S-OFDM and the non-systematic complex coded UW-DFT-S-OFDM scheme both yield better OOB leakage performance than CP OFDM. The systematic UW DFT-S-OFDM exhibits slightly better OOB leakage performance compared to the ZT DFT-S-OFDM since the proposed scheme achieves a better continuity due to the suppressed tail. On the other hand, the OOB performance of Non-systematic complex coded UW DFT-S-OFDM depends on the filter. In FIG. 18A, a short filter is considered. In this case, the OOB leakage is worse than the ZT-DFT-S-OFDM and UW DFT-S-OFDM. However, when the filter length is chosen as 128, the OOB leakage is better than the other schemes, as illustrated in FIG. 18B.

3.4 PAPR

FIG. 19 is a graph showing a comparison of Peak-to-Average Power Ratio (PAPR) for CP OFDM, ZT DFT-S-OFDM, UW DFT-S-OFDM, and non-systematic complex coded UW DFT-S-OFDM with UW for a filter length of 64×2 4QAM according to simulations. FIG. 19 uses the complementary cumulative distribution function (CCDF).

3.5 BER Performance

In order to achieve a fair comparison of the BER performance of the different schemes, identical symbol energy is considered in the simulations, i.e., the energy per symbol is normalized by considering the energy consumed by CP for the CP OFDM scheme, and the redundant subcarriers for the proposed scheme. For all the schemes, we consider an MMSE-FDE (Minimum Mean Square Error—Frequency Domain Equalization), which allows the receiver to exploit the path diversity for SC systems. No channel coding is considered in the simulations. For non-systematic complex coded UW-DFT-S-OFDM receiver an iterative receiver, which recalculates the periodic self-interference in each iteration, considered in order avoid noise enhancement.

FIG. 20 is a graph showing a comparison of Bit Error Rate (BER) in a 4QAM Additive White Gaussian Noise (AWGN) channel for CP OFDM, ZT DFT-S-OFDM, UW DFT-S-OFDM, and non-systematic complex coded UW DFT-S-OFDM according to simulations. Note that the UW scheme allows the receiver to exploit all the symbol energy; by contrast, some portion of the symbol energy is lost for the CP OFDM scheme as the CP is discarded, which is why the CP OFDM does not attain the Gaussian bound, while the other schemes do.

FIG. 21 is a graph showing a comparison of Bit Error Rate (BER) in a 256QAM exponentially decaying channel for CP OFDM, ZT DFT-S-OFDM, UW DFT-S-OFDM, and non-systematic complex coded UW DFT-S-OFDM according to simulations. In FIG. 21, the BER performance is investigated by considering the impact of the multipath channel. When T=0.3, the OFDM and the proposed schemes yield a better BER performance and the ZT DFT-S-OFDM scheme saturates at a high SNR. This may be understood by noting that the ZT DFT-S-OFDM scheme does not exactly maintain the circular convolution of the channel and ISI dominates the noise. On the other hand, Non-systematic complex coded UW-DFT-S-OFDM and UW-DFT-S-OFDM achieves the same performance.

4 Networks for Implementation

While the invention has been described primarily in connection with future generations of 3GPP telecommunications systems (e.g., 5G), the concepts expressed herein are not necessarily so limited. The following is a description of a few exemplary wireless networks and related components in which one or more of the disclosed embodiments may be implemented.

FIG. 22A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 22A, the communications system 100 may include wireless transmit/receive units (WTRUs) 102a, 102b, 102c, 102d, a radio access network (RAN) 104, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, which may be referred to as a "station" and/or a "STA", may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. The WTRU 102a, 102b, 102c and 102d is interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 22A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 22A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 22A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM, UMTS, CDMA 2000, WiMAX, or WiFi radio technology.

The core network 106/107/109 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 22A may be configured to communicate with the base station 114a, which may employ a cellular-based radio technology, and with the base station 114b, which may employ an IEEE 802 radio technology.

FIG. 22B is a system diagram illustrating an example WTRU 102. As shown in FIG. 22B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 22B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 22B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like. In a case where the peripherals 138 includes one or more sensors, the sensors may be one or more of a gyroscope, an accelerometer; an orientation sensor, a proximity sensor, a temperature sensor, a time sensor; a geolocation sensor; an altimeter, a light sensor, a touch sensor, a magnetometer, a barometer, a gesture sensor, and/or a humidity sensor.

The WTRU 102 may include a full duplex radio for which transmission and reception of some or all of the signals (e.g., associated with particular subframes for both the UL (e.g., for transmission) and downlink (e.g. for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118).

FIG. 22C is a system diagram illustrating the RAN 103 and the core network 106 according to another embodiment. As noted above, the RAN 103 may employ a UTRA radio technology to communicate with the WTRUs 102a, 102b, 102c over the air interface 115. The RAN 103 may also be in communication with the core network 106. As shown in FIG. 22C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 22C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 22C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the other networks 112, which may include other wired and/or wireless networks that are owned and/or operated by other service providers.

FIG. 22D is a system diagram illustrating the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 22D, the eNode-Bs 160a, 160b, 160c may communicate with one another over an X2 interface.

The core network 107 shown in FIG. 22D may include a mobility management entity (MME) 162, a serving gateway (SGW) 164, and a packet data network (PDN) gateway (or PGW) 166. While each of the foregoing elements are depicted as part of the core network 107, it will be appreciated that any of these elements may be owned and/or operated by an entity other than the core network operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The serving gateway 164 may be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the other networks 112, which may include other wired and/or wireless networks that are owned and/or operated by other service providers.

FIG. 22E is a system diagram illustrating the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 22E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. The base station 180a, for example, may use multiple antennas to transmit wireless signals to, and/or receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 100c.

As shown in FIG. 22E, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any of these elements may be owned and/or operated by an entity other than the core network operator.

The MIP-HA 184 may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c, and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. The gateway 188 may provide the WTRUs 102a, 102b, 102c with access to the other networks 112, which may include other wired and/or wireless networks that are owned and/or operated by other service providers.

Although not shown in FIG. 22E, it will be appreciated that the RAN 105 may be connected to other ASNs, other RANS (e.g., RANs 103 and/or 104) and/or the core network 109 may be connected to other core networks (e.g., core network 106 and/or 107. The communication link between the RAN 105 and the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although the WTRU is described in FIGS. 1A-1E as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent 20 MHz channel to form a 40 MHz wide contiguous channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

5 Conclusion

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed", "computer executed", or "CPU executed".

One of ordinary skill in the art will appreciate that the acts and symbolically represented operations or instructions include the manipulation of electrical signals by the CPU.

An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1-5.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to", "at least," "greater than", "less than", and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

In addition, use of the terms "means for" in any claim is intended to invoke 35 U.S.C. § 112, 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

6 References

[1] Berardinelli, G.; Tavares, F. M. L.; Sørensen, T. B.; Mogensen, P.; Pajukoski, K., "On the Potential of Zero-Tail DFT-Spread-OFDM in 5G Networks," Proc. IEEE Vehicular Technology Conference (VTC), September 2014;

[2] Berardinelli, G.; Tavares, F. M. L.; Sorensen, T. B.; Mogensen, P.; Pajukoski, K., "Zero-tail DFT-spread-OFDM signals," Proc. IEEE Globecom Workshops (GC Wkshps), December 2013;

[3] Gilberto Berardinelli, Bernhard Raaf, Fernando Tavares, Jurgen Michel "Zero insertion for ISI free OFDM reception" WO 2014124661 A1, 2014;

[4] Mario Huemer, Christian Hofbauer, Alexander Onic, Johannes B. Huber, Design and analysis of UW-OFDM signals, AEU—International Journal of Electronics and Communications, Volume 68, Issue 10, October 2014;

[5] Huemer, M.; Hofbauer, C.; Huber, J. B., "Non-systematic complex coded Complex Number RS Coded OFDM by Unique Word Prefix," IEEE Transactions on Signal Processing, vol. 60, no. 1, pp. 285, 299, January 2012;

[6] Fabriozi Pancaldi et al. "Single carrier Frequency Domain Equalization" IEEE Sig. Proc. Mag., September 2008;

[7] Michailow, N.; Matthe, M.; Gaspar, I. S.; Caldevilla, A. N.; Mendes, L. L.; Festag, A.; Fettweis, G., "Generalized Frequency Division Multiplexing for 5th Generation Cellular Networks," *IEEE Transactions on Communications*, vol. 62, no. 9, pp. 3045, 3061, September 2014;

[8] Michailow, N.; Gaspar, I.; Krone, S.; Lentmaier, M.; Fettweis, G., "Generalized frequency division multiplexing: Analysis of an alternative multi-carrier technique for next generation cellular systems," Proc. *IEEE International Symposium on Wireless Communication Systems (ISWCS)*, vol., no., pp. 171, 175, 28-31 Aug. 2012;

[9] Alphan Sahin, Rui Yang, Fengjun Xi, Hanqing Lou, Oghenekome Oteri, Bob Olesen Unique Word Discrete Fourier Transform Spread Orthogonal Frequency Division Multiplexing, U. S. Provisional Patent Application No. 62/190,512;

[10] A. Sahin, R. Yang, M. Ghosh, and R. L. Olesen, "An Improved Unique Word DFT-Spread OFDM Waveform for 5G Mobile Broadband", accepted to IEEE Global Communications Conference Workshop on 5G & Beyond—Enabling Technologies and Applications, San Diego, December 2015;

[11] Hasegawa, F.; Shinjo, S.; Okazaki, A.; Okamura, A.; Brunel, L.; Mottier, D., "Static sequence assisted out-of-band power suppression for DFT-s-OFDM," in Personal, Indoor, and Mobile Radio Communications (PIMRC), 2015 IEEE 26th Annual International Symposium on, vol., no., pp. 61-66, Aug. 30, 2015-Sep. 2, 2015.

7 Addendum

Proposition 1:

Let $x_{discard}[n]$ be a sequence obtained by discarding every other $\{T|M=\alpha T, \alpha \in \mathbb{Z}\}$ samples of x[n] where M is the length of the sequence x[n]. Then, it is possible to decompose the DFT of $x_{discard}[n]$ as $$X_{discard}[k]=X[k]+R[k],$$

where R[n] is a periodic with $\alpha=M/T$.

Proof 1:

The sequence $x_{discard}[n]$ can be expressed by using an auxiliary sequence r[n].

$$x_{discard}[n]=x[n]+r[n],$$

where $$r[n] \triangleq \begin{cases} x[n] & \frac{n}{T} \in \mathbb{Z} \\ 0 & \text{otherwise} \end{cases}.$$

Since the DFT operation is linear, the DFT of $x_{discard}[n]$ can be expressed as $$X_{discard}[k]=X[k]+R[k].$$

The DFT of r[n], i.e., R[k], can be obtained as $$R[k] = \sum_{n=0}^{M-1} r[n]e^{-2\pi k \frac{n}{M}} \stackrel{(a)}{=} \sum_{n=0}^{M/T-1} x[nT]e^{-2\pi k \frac{Tn}{M}} \stackrel{(b)}{=} X_{interleaved}[k \bmod(M)]$$

where (a) is because of the fact that r[n] is non-zero only when $$\frac{n}{T}$$

is an integer and (b) is is due to the periodicity of the function $$e^{-2\pi k \frac{Tn}{M}},$$

which result in a sequence with the periodicity of M/T.

What is claimed is:

1. A method implemented in a wireless transmit/receive unit for transmitting symbols using discrete Fourier transformation (DFT) spread orthogonal frequency division multiplexing (DFT-S-OFDM), the method comprising:

mapping a first symbol vector to inputs of a DFT spread block using a permutation matrix that inserts zeroes into the first symbol vector corresponding to inputs of the DFT spread block to which symbols of the first symbol vector are not mapped to produce a second vector;

inserting a perturbation into the second vector to produce a third vector;

performing a DFT on the third vector to produce a fourth vector, wherein the perturbation is configured to generate zeros on predetermined elements of the fourth vector;

performing an inverse DFT (IDFT) operation on the fourth vector to produce an IDFT output signal;

cancelling a tail of the IDFT output signal to produce a modified IDFT output signal; and transmitting the modified IDFT output signal.

2. The method of claim 1 wherein the zeroes are inserted in a periodic manner.

3. The method of claim 2 wherein the zeroes are interleaved in the second vector.

4. The method of claim 1 further comprising:
adding any of a Unique Word (UW) signal and a circular prefix (CP) to the modified IDFT output signal prior to transmitting.

5. The method of claim 1 further comprising:
adding a guard band to one or more symbols in the modified IDFT output signal.

6. The method of claim 5 wherein adding the guard band comprises adding the guard band in a frequency domain.

7. The method of claim 6 wherein adding the guard band comprises multiplying a plurality of output values of a DFT with filter coefficients.

8. The method of claim 1 wherein the perturbation is a vector and wherein the vector is configured to suppress information on the predetermined elements of the fourth vector.

9. The method of claim 1 wherein the permutation matrix does not map any of the symbols to the upper and lower ends of the DFT spread block.

10. The method of claim 1 wherein inserting the perturbation comprises operating on the first symbol vector with a precoding matrix.

11. A wireless transmit/receive unit comprising circuitry, including a transmitter and processor, configured to:

map a first symbol vector to inputs of a discrete Fourier transformation (DFT) spread block using a permutation matrix that inserts zeroes into the first symbol vector corresponding to inputs of the DFT spread block to which symbols of the first symbol vector are not mapped to produce a second vector;

insert a perturbation into the second vector to produce a third vector;

perform a DFT on the third vector to produce a fourth vector, wherein the perturbation is configured to generate zeros on predetermined elements of the fourth vector;

perform an inverse DFT (IDFT) operation on the fourth vector to produce an IDFT output signal;

cancel a tail of the IDFT output signal to produce a modified IDFT output signal; and transmit the modified IDFT output signal using DFT spread orthogonal frequency division multiplexing (DFT-S-OFDM).

12. The wireless transmit/receive unit of claim 11 wherein the zeroes are inserted in a periodic manner.

13. The wireless transmit/receive unit of claim 12 wherein the zeroes are interleaved in the second vector.

14. The wireless transmit/receive unit of claim 11 wherein the circuitry is configured to add any of a Unique Word (UW) signal and a circular prefix (CP) to the modified IDFT output signal prior to transmitting.

15. The wireless transmit/receive unit of claim 11 wherein the circuitry is configured to add a guard band to one or more symbols in the modified IDFT output signal.

16. The wireless transmit/receive unit of claim 15 wherein the circuitry is configured to add the guard band in a frequency domain.

17. The wireless transmit/receive unit of claim 16 wherein the circuitry is configured to add the guard band at least in part by multiplying a plurality of output values of a DFT with filter coefficients.

18. The wireless transmit/receive unit of claim 11 wherein the perturbation is a vector, and wherein the vector is configured to suppress information on the predetermined elements of the fourth vector.

19. The wireless transmit/receive unit of claim 11 wherein the permutation matrix does not map any of the symbols to the upper and lower ends of the DFT spread block.

20. The wireless transmit/receive unit of claim 11 wherein inserting the perturbation comprises operating on the first symbol vector with a precoding matrix.

* * * * *

UNITED STATES PATENT AND TRADEMARK OFFICE
CERTIFICATE OF CORRECTION

PATENT NO. : 10,764,102 B2
APPLICATION NO. : 16/094748
DATED : September 1, 2020
INVENTOR(S) : Alphan Sahin et al.

It is certified that error appears in the above-identified patent and that said Letters Patent is hereby corrected as shown below:

In the Claims

At Column 31, Line 32, Claim 8, delete "vector" and insert --vector,--

Signed and Sealed this
Twentieth Day of August, 2024

Katherine Kelly Vidal
*Director of the United States Patent and Trademark Office*